United States Patent [19]

Froyd

[11] Patent Number: 5,025,385
[45] Date of Patent: Jun. 18, 1991

[54] MULTIPLE AXIS MOTION CONTROL SYSTEM

[76] Inventor: Stanley G. Froyd, 5537 Calle Arena, Carpenteria, Calif. 93013

[21] Appl. No.: 529,132

[22] Filed: May 25, 1990

Related U.S. Application Data

[62] Division of Ser. No. 181,820, Apr. 15, 1988, Pat. No. 4,947,336.

[51] Int. Cl.[5] .............................................. G06F 15/46
[52] U.S. Cl. .............................. 364/474.11; 364/165; 364/474.3
[58] Field of Search ................ 364/474.11, 474.3, 164, 364/165, 167.01, 513; 318/568, 18, 615-618

[56] References Cited

U.S. PATENT DOCUMENTS

| | | | |
|---|---|---|---|
| 4,763,055 | 8/1988 | Daggett et al. | 364/478 X |
| 4,772,831 | 9/1988 | Casler, Jr. et al. | 364/513 X |
| 4,773,025 | 9/1988 | Penkar et al. | 364/513 |
| 4,774,445 | 9/1988 | Penkar | 364/167.01 X |

Primary Examiner—Joseph Ruggiero
Attorney, Agent, or Firm—Hornbaker & Rosen Freilich

[57] ABSTRACT

The invention is directed to an improved motion control system for controlling multiple motion actuators associated with different axes for moving a member along a defined path. The system is intended to move a member along the defined path as a result of the coordinated motion of two or more essentially independent motion actuators. In accordance with the invention, instead of responding to a servo lag error between a commanded and actual position, the velocity along each axis for each path segment is established by a feedforward data file generated by "looking ahead" at input describing the full path and processing this data, together with machine specific data specifying the operational characteristics (or capabilities) of the machine (e.g. milling machine) to be operated.

3 Claims, 9 Drawing Sheets

MULTIPLE AXIS MOTION CONTROL SYSTEM

This is a divisional of co-pending application Ser. No. 181,820 filed on Apr. 15, 1988 U.S. Pat. No. 4,947,336.

FIELD OF THE INVENTION

This invention relates generally to systems for controlling the motion of multiple axis mechanisms, typified by numerically controlled machine tools (e.g. milling machines, turning machines, grinders, cutters, etc.), robotic manipulators, and various special purpose machines. More specifically, the invention is directed to a system for controlling and coordinating the motion of multiple single axis actuators (e.g. motors) to optimally move a member (e.g. cutting tool or work piece) along a predefined path at a high speed.

BACKGROUND OF THE INVENTION

The machine tool control and related arts are quite well developed and have given rise to a myriad of patents disclosing systems for controlling the motion of a movable member such as a cutting tool or work piece. Exemplary prior art systems are disclosed in the following U.S. Pat. Nos.

| | | |
|---|---|---|
| 4,096,563 | 4,396,987 | 4,587,607 |
| 4,215,406 | 4,433,383 | 4,598,380 |
| 4,251,858 | 4,472,783 | 4,616,326 |
| 4,262,336 | 4,473,883 | 4,639,653 |
| 4,288,849 | 4,531,182 | 4,639,878 |
| 4,306,292 | 4,550,366 | 4,661,912 |
| 4,332,012 | 4,550,375 | 4,663,730 |
| 4,347,564 | 4,564,913 | 4,672,550 |
| 4,396,973 | | |

Typically, such prior art systems cause a movable member to traverse a path described by an input NC part program which includes data, either incremental or absolute, defining path segments, as well as a nominal progression rate along the path. The input part program may be presented in the form of punched paper tape or other physical media or may be represented electronically. The input data is typically supplied to a command position synthesizer which generates continuously updated command position signals, each defining the desired instantaneous position for one of the axis actuators. More specifically, the command position signals are supplied to multiple position servo loops, each such loop controlling a different axis actuator. Typically, each position servo loop controls an axis actuator by producing a motor speed command proportional to the difference (error) between the commanded (or desired) position and an actual (or sensed) position. A speed regulating loop is generally associated with each position servo loop to improve the faithfulness with which the actuator reacts to the motor speed command. Without the speed regulating loop, the precision of the actuator would not only depend on position error, but on velocity error as well.

When operating at high speeds, such prior art systems generally exhibit inaccuracies on contoured paths because of servo lag error typically associated with position loops which create axis motion only in response to an error, i.e. difference between the commanded position and actual position. Feed rate along the path typically must be restricted to maintain the error within tolerable levels, thus compromising machine productivity and causing longer than optimal point to point positioning times.

More specifically, typical prior art systems use a "boxcar" interpolation scheme in which step-function position-change commands are input to a Type 1 position servo loop which acts as a filter. In this type of system, axis motion results from the error, or "lag" between the commanded and actual position. This error does not produce machining error on straight-line paths, but does result in corner and circle undercutting. The amount of undercut is related to the speed of traversal along the path; for example, a 1"diameter circle would be 0.020" undersize if executed at 100 IPM on a machine with a response of 16.7 rad/sec. Moreover, in addition to undercutting, conventional approaches exhibit relatively slow response times, and fail to exploit the full acceleration capabilities of the machine.

A further machine performance limitation imposed by conventional control systems is the limited part-program data input and processing rates which they are able to sustain. A complex path will consist of numerous short line and arc segments, requiring a significant amount of input data to define the path. Performance is then bounded by the read speed of the input system and the linear and circular data block processing time.

SUMMARY OF THE INVENTION

The present invention is directed to an improved motion control system for controlling multiple motion actuators associated with different axes for moving a member along a defined path. More specifically, the system is intended to move a member along the defined path as a result of the coordinated motion of two or more essentially independent motion actuators. In the simplest case, motion is produced by two actuators which respectively move the member along two perpendicularly related axes of a simple XY machine.

Consider a case where a path to be followed by a movable member consists of two successive straight line segments AB and BC, connected at a junction B so that the angle between the segments is ABC. Consider further that the member is to start from rest at point A and end at rest at point C. Accordingly, the member must accelerate along line segment AB until some limiting speed is reached, then slow for the corner at B, accelerate again along line segment BC, then slow and stop at the end point C. Note that if a line segment is not parallel to an axis, then both axis actuators must simultaneously move in a coordinated fashion to trace the desired path.

In determining the aforementioned limiting speed along AB, several factors must be considered. For example, the angle ABC will in part dictate how quickly the member can traverse the corner while remaining within a tolerance band and the length of segment BC may limit the speed along AB to prevent overshooting point C. The speed may also be limited, of course, by the acceleration capability of the machine, the maximum speed capability of the axis actuators involved, and the limits imposed by the procedure in which the machine is involved.

In accordance with the present invention, instead of responding to a servo lag error between a commanded and actual position, the velocity along each axis for each path segment is established by a feedforward data file generated by "looking ahead" at input describing the full path and processing this data, together with machine specific data specifying the operational characteristics (or capabilities) of the machine (e.g. milling machine) to be operated.

More specifically, in accordance with the present invention, feedforward processing means, operating either off-line or in real-time, are provided for operating on input data describing the path and nominal feed rate along the path to generate a progress profile of position and velocity versus time so that the machine member will traverse the path while moving at either the nominal feed rate or accelerating (or decelerating) toward (or from) that rate. The acceleration rate is determined by the feedforward processing means based on the specified nominal feed rate, the machine specific data, and the path to be traversed. The processing means develops the progress profile by looking forward many path segments to analyze critical path points such as corners or stops. For example only, obtuse corners can be negotiated more swiftly than acute corners and acceleration intervals can be longer for longer path segments.

In the preferred embodiment of the invention, the feedforward processing means comprises a host computer operating off-line to execute a program (NCTOFNC) for translating conventional NC part program data into a feedforward data file (FNC data file) to operate a machine control unit in accordance with the invention. In producing the FNC data file the host computer takes advantage of the fact that the entire machine path has been predefined by the part program enabling it to perform an interpolation function to determine slowdown points and path velocities based on upcoming corners and intersections in the path, taking into consideration the dynamic capabilities of the target machine.

In the preferred implementation, the host computer translates the input data into geometric descriptions and then calculates optimal dynamic motion profiles based on the path to be followed and the dynamic capabilities of the individual axis actuators. In order to do this, the computer "looks ahead" along the path to determine corners, slowdowns, and straightaways. The resulting FNC data file comprises a sequence of FNC data blocks which define velocity and position values versus time for each axis. This file is supplied to a machine control unit (MCU) which in turn meters out the velocity and position information to each machine axis actuator.

In accordance with the invention, each MCU is comprised of position commander means which produces motion sample data, and velocity profiler means which produces feedforward velocity data, for each machine axis channel. For each motion sample, after data has been supplied to all channels, an interpolation gate means is activated to cause each channel to execute the motion commanded by the motion sample supplied to it.

In accordance with the preferred embodiment, each MCU velocity profiler means responds to a supplied FNC data file to produce the feedforward velocity signal and to control the rate of execution of the motion commanded by the motion sample. More specifically, the feedforward velocity data is applied to a digital to analog converter (DAC) and the resulting feedforward velocity signal is summed with a position error signal produced by a position servo loop, fed by said motion sample data, to thus create an axis speed command. The feedforward velocity signal by itself could be sufficient to cause the machine to optimally move along the defined path, but minor positioning errors could result from drift, cutting forces, etc. The motion sample data supplied by the positioner commander eliminates such minor position errors.

DETAILED DESCRIPTION

Figure 1:
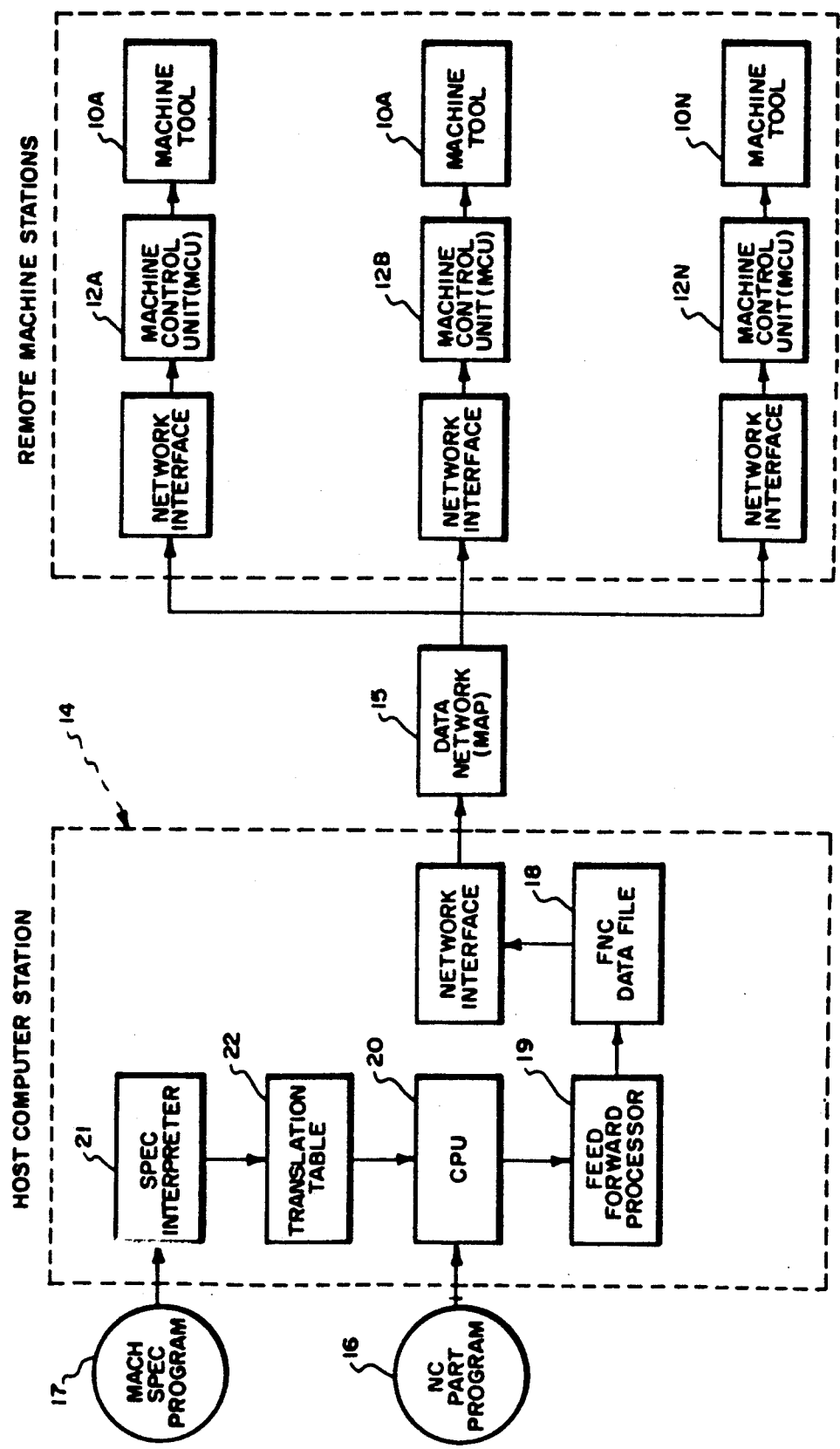
FIG. 1 is a block diagram depicting a system in accordance with the present invention for communicating with and controlling multiple machine control units.

Attention is initially directed to FIG. 1 which comprises a block diagram depicting a preferred system embodiment in accordance with the present invention for controlling a plurality of multiple axis machine tools 10A, 10B, . . . 10N. Each machine tool is directly controlled by a machine Control unit (MCU) 12A, 12B, . . . 12N typically located immediately adjacent to, and wired directly to, its related machine tool. In a typical environment for the system of FIG. 1, the multiple machine tools and their associated machine control units, are physically distributed, throughout a plant facility.

In accordance with the system environment depicted in FIG.1, each machine control unit 12 is responsive to data supplied thereto from a host computer station 14 via a data network 15. Although various networks and protocols could be utilized consistent with the present invention, it is contemplated that communication between the host computer station 14 and the machine control units 12 be in accordance with the so called Manufacturing Automation Protocol (MAP).

The host computer station 14 in applicant's preferred embodiment responds to conventional NC part program inputs 16 and to machine specification program inputs 17 to produce feedforward numerical control (FNC) data files 18 for application to the machine control units 12 via the data network 15. Each FNC data file 18 is produced by a feedforward processor 19 which, in applicant's preferred embodiment, is implemented by the execution of a feedforward processor program (NCTOFNC) run on a central processing unit (CPU) 20. The CPU 20 executes the NCTOFNC program, utilizing data from the part program 16 and the specification program 17 (specifying the characteristics of the machine tool being operated), via a specification interpreter 21 and translation table 22, to generate an FNC data file.

More specifically, the host computer station 14 generates FNC data for each axis of each machine control unit 12 to cause multiple motion actuators, each associated with a different axis, to move a machine member in a coordinated fashion along a path defined by an NC part program. Briefly, the feedforward processing means 19 operates on NC part program data which fully describes a path, and the nominal feed rate along the path, to develop a progress profile of position and velocity versus time with respect to each machine axis. The purpose is to optimally operate each axis motion actuator so that it will move its machine output member either at its defined nominal feed rate or at a rate accelerating toward, or decelerating from that nominal rate. The acceleration rate is determined by the feedforward processor 19 based on the specified nominal feed rate, the entire path to be traversed and the machine specification data. More specifically, the feedforward processor translates the NC part program data into geometric descriptions and then calculates optimal dynamic motion profiles based on the path and the dynamic capabilities of each machine axis. In order to do this, the processor 19 "looks ahead" along the motion path to determine corners, slowdowns, and straightaways. For example only, obtuse corners can be negotiated more swiftly than acute corners. As a further example, an actuator will more typically be accelerated to its nominal feed rate in the case of a longer path segment than for a shorter path segment where it may only be able to accelerate for a short time before having to be decelerated to negotiate a corner or stop.

The feedforward processing means 19 includes an interpolator function which produces the FNC data file in a format that may be visualized as a table of samples specifying the desired instantaneous velocity and position values at spaced instants in time for each axis. The time intervals between samples is preferably substantially equal and, in a preferred implementation, on the order of ten milliseconds, well above the response bandwidth of a typical machine. These sample values are then metered out by the machine control unit to each of its motion actuators at the required rate.

The necessity to analyze the path and continually provide instantaneous velocity and position samples for each axis constitutes a computationally intensive activity. Thus, it requires the utilization of a relatively powerful computer, e.g. of the minicomputer class such as a VAX computer manufactured by Digital Equipment Corporation. Rather than provide such expensive computational power at each machine control unit, the preferred system depicted in FIG. 1 contemplates the utilization of a host computer of the minicomputer class shared by a plurality of microprocessor based machine control units 12. Whereas the machine control units 12 must operate in real time to directly control the machine tools 10, host computer 14 need not operate in real time and can calculate the FNC data files off-line and store and transmit them via the network 15 to the MCU's. Thus, the machine control units 12 can be of relatively simple design specifically configured to accept FNC data files 18 specifying instantaneous velocity and position samples. Thus, as will be seen hereinafter, systems in accordance with the invention are able to achieve better performance, i.e. more rapid and more accurate control of the movable machine member, frequently at a lower cost.

In order to reduce the demands for data storage (at the host) and data communications with the MCU's, data compaction techniques are preferably used in generating the FNC data files; e.g., firstly, no data is transmitted to nonmoving axes; secondly, for straight-line motions (which typically comprise the majority), a single data block is sent which includes the beginning and ending velocity ramps); thirdly, all data is expressed in a binary format; and lastly, position information is sent as small departures from the previous position, rather than as absolute positions which would require more digits. The resulting data file is still typically larger than the original NC part-program file, but not unreasonably so.

Figure 2:
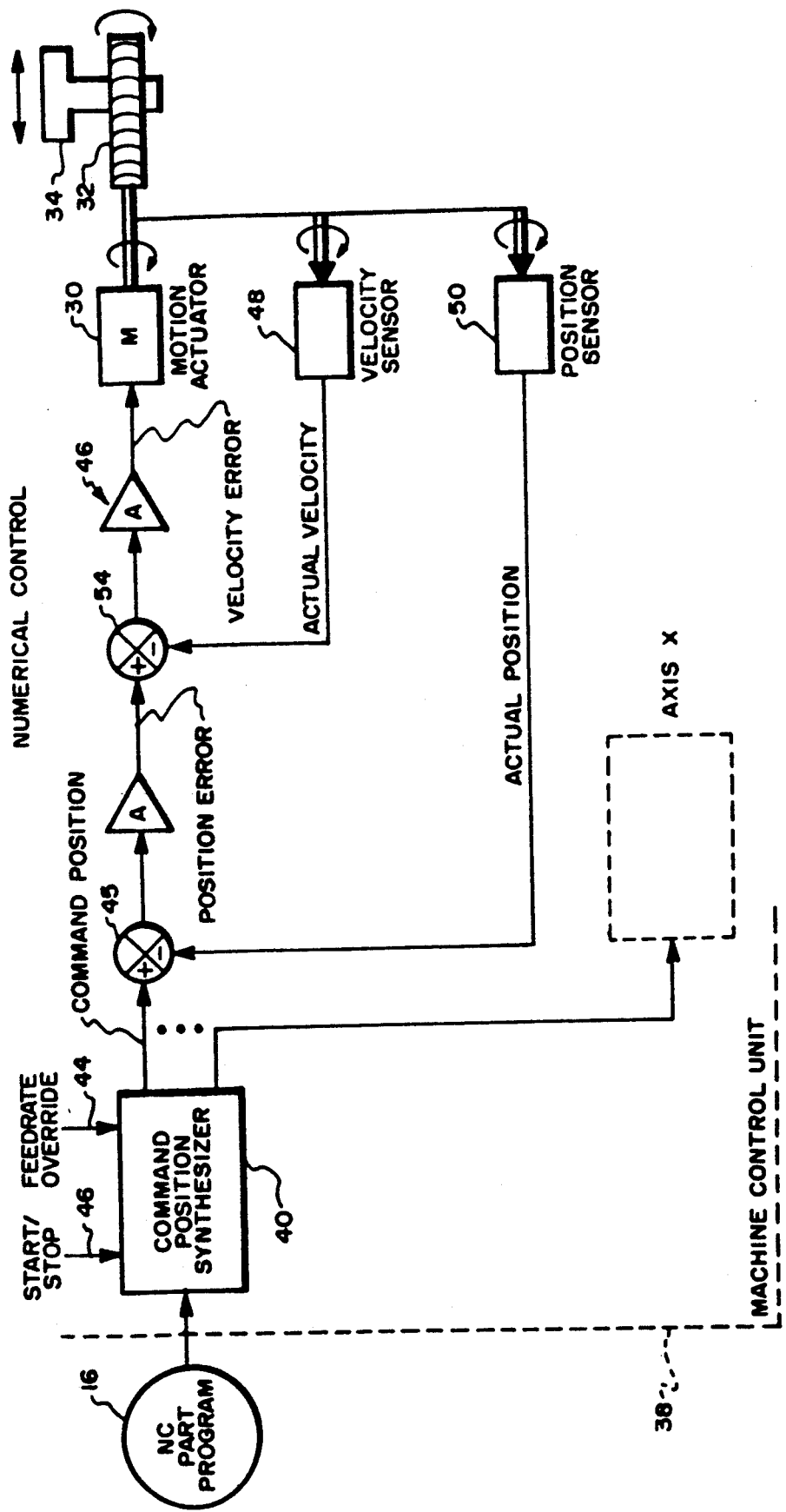
FIG. 2 is a block diagram representing a typical prior art control system for a numerical control machine.

To better understand the specific configuration of machine control units in accordance with the invention, attention is first directed to FIG. 2 which depicts a typical prior art NC control system for driving multiple motion actuators 30 of a single machine tool. Then reference will be directed to FIG. 3 which generally depicts a comparable system implemented in accordance with the present invention. The motion actuator 30 typically comprises a motor which may, for example, rotate a lead screw 32 to drive a member, such as a table 34 along a specific axis. Multiple axis NC control systems, as exemplified by FIG. 2, are well known in the art and are used in various applications, typically to drive machine tools.

Such prior art systems are generally comprised of a machine control unit 38 including a computer based command position synthesizer 40 which generates command position output signals for each axis in response to an NC part program input 16. NC part program formats are well known in the art and generally are comprised of a series of simple statements which define the motion along a path. The command position synthesizer 40 typically also has manual inputs, e.g. a start/stop input 42 and a feed rate override input 44, both available to the operator. The command position synthesizer 40 operates to interpret the NC part program and manual inputs to generate a plurality of command position signals. Each command position signal is supplied to a summing junction 45 of a position loop of a servo subsystem 46 associated with each axis. For simplicity, FIG. 2 only illustrates the servo subsystem associated with axis 1.

The servo subsystem 46 typically includes a velocity sensor 48 and a position sensor 50 for respectively producing velocity and position feedback signals indicating the actual velocity and position of the motor actuator output member. The actual position signal generated by the position sensor 50 is applied to summer 45 along with the command position signal supplied by synthesizer 40 to produce a position error signal. The position error signal is applied to a summer 54 along with the actual velocity signal produced by the velocity sensor 48 to generate a velocity error signal which is applied to the motor 30. In this manner, the motor 30 is caused to track the position commanded by the synthesizer 40. That is, the position error signal produced by summer 45 creates a motor speed command which is proportional to the difference (error) between the commanded and actual positions. This position error signal then essentially establishes the velocity of the motor 30 and is regulated by the velocity loop comprised of velocity sensor 48.

Prior art systems, as exemplified by FIG. 2, are speed limited, in part, because of the inherent lag required to produce actuator motion. That is, as can be seen from FIG. 2, motor 30 is driven only in response to an error, i.e. difference, between the commanded position and actual position, appearing at the output of summer 45. If the system is operated at too high a speed, the machine member will often be unable to precisely follow contoured paths because of this servo lag error. Accordingly, in practice, conventional machines are operated such that the feed rate along the path is restricted to maintain the machining inaccuracies within tolerance limits. This, of course, compromises machine productivity by reducing the maximum feed rate tolerable and by causing longer than optimal point to point positioning times.

Figure 3:
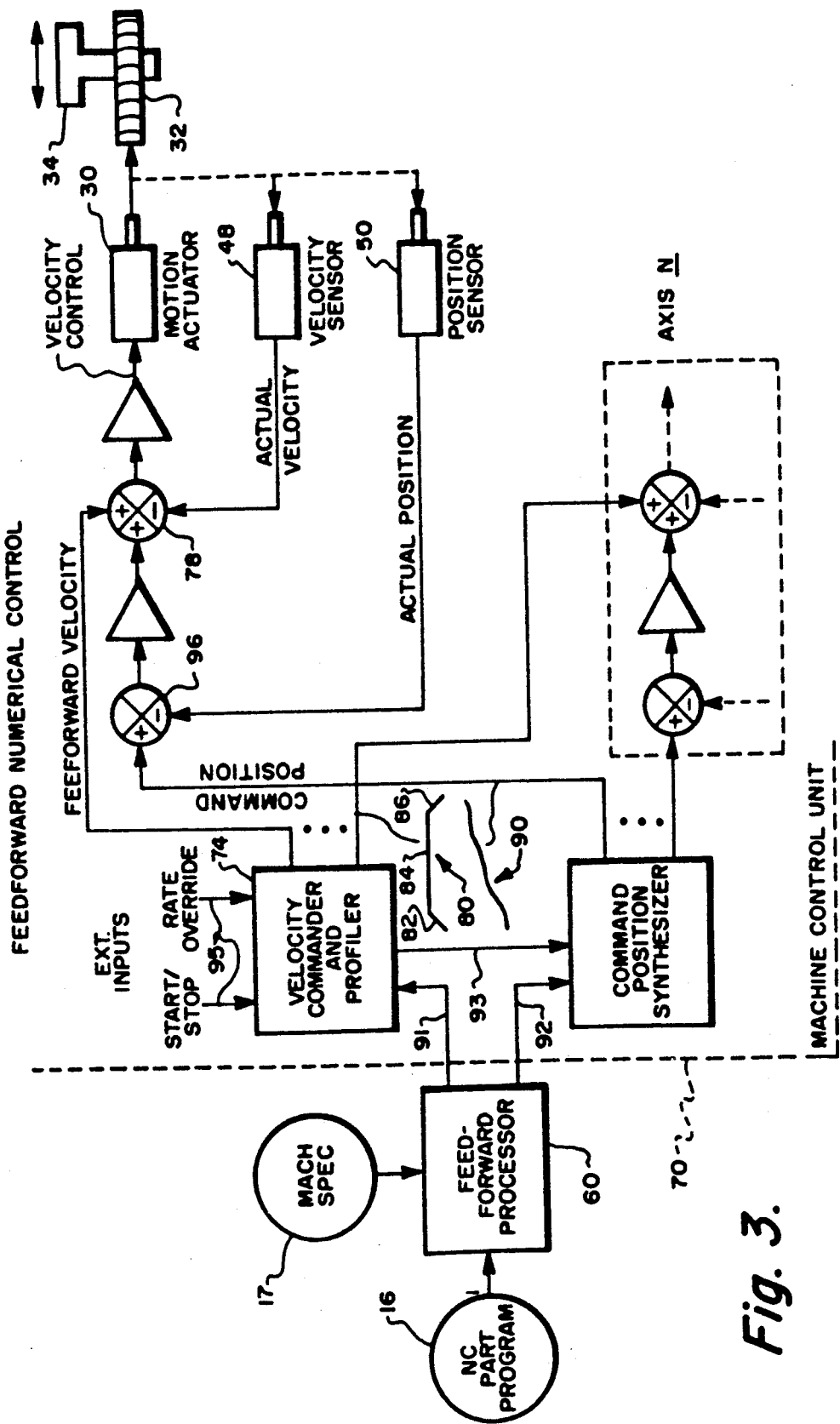
FIG. 3 is a block diagram illustrating a generalized feedforward control system in accordance with the present invention.

Attention is now directed to FIG. 3, which illustrates a generalized block diagram similar to FIG. 2 but modified to depict improvements in accordance with the present invention. Note that the system of FIG. 3 is functionally similar to the system of FIG. 2 to the extent that it responds to the same NC part program 16 to control the same motion actuator 30. However, as will become apparent hereinafter, the system of FIG. 3 can operate at higher speeds, and/or higher accuracies, as a consequence of more precisely controlling the velocity of the motion actuator 30 and avoiding the servo lag error characteristic of prior art systems.

In contrast to the system of FIG. 2 where the command position synthesizer 40 responded directly to the NC part program input, the system of FIG. 3 includes feedforward processor 60 which responds to the NC part program input to produce the aforementioned feedforward (FNC) data file for controlling a machine control unit 70 including a command position synthesizer 72 and a velocity commander and profiler (hereinafter, "velocity profiler") 74. As previously mentioned, feedforward processor 60 operates on the NC part program input 16 to generate a progress profile of position and velocity versus time. More specifically, the feedforward processor responds to the NC part program 16 and the machine specification program 17 (i.e. characteristics of motion actuators 30, etc.) to output FNC data blocks where each data block defines one or more segments of the path to be traversed by the machine member. Each FNC data block drives the velocity profiler 74, as will be discussed in greater detail hereinafter, to produce instantaneous feedforward velocity signals, each applied to a different summer 78. The purpose of the feedforward velocity signal is to precisely control the instantaneous velocity of the motion actuator 30 and avoid the servo lag characteristic of prior art systems typified by FIG. 2. For each path segment, the velocity profiler 74 will typically define a trapezoidally shaped velocity versus time profile 80 for the motion actuator 30. The velocity profile 80 is comprised of three primary portions; namely, an acceleration portion 82, a nominal velocity portion 84, and a deceleration portion 86. The feedforward signals defining this velocity profile are applied to summer 78 and summed with the actual velocity signal from velocity sensor 48 to drive the motion actuator at the velocity defined by the feedforward velocity signal.

Although the feedforward velocity signals generated by the velocity profiler 74 should be sufficient to optimally move the motion actuator 30 along the defined path, it has been recognized that minor positioning errors could result from drift, cutting forces, etc. In order to avoid these positioning errors, the command position synthesizer 72 outputs command position signals, each defining a position profile 90 corresponding to the integral of the velocity profile 80.

More specifically, as will be described in greater detail hereinafter, the feedforward processor 60 outputs FNC data blocks containing velocity information, position information and shape (acceleration, deceleration) information. In the generalized preferred embodiment depicted in FIG. 3, the velocity profiler 74 derives the velocity information and shape information from processor 60 via line 91. The command position synthesizer derives position information via line 92. In addition to generating the feedforward velocity signal defining the velocity profile, the profiler 74, via line 93, controls the command position synthesizer 72 to assure that the instantaneous position, as defined by the command position signal, is the integral of the instantaneous velocity, as defined by the feedforward velocity.

It should be noted that in addition to responding to velocity and shape information, velocity profiler 74 also is responsive to external inputs 95 such as operator controls or machine tool sensors.

The command position signals generated by synthesizer 72 are applied to a summer 96, analogous to the summer 52 of FIG. 2. The actual position signals generated by the position sensor 50 in FIG. 3 are also applied to the summer 92 which produces a difference or position error signal which is then applied to summer 78. The output of summer 78 comprises a velocity control signal which is applied to the motion actuator 30, typically via an amplification, means as shown.

The FNC data file supplied by feedforward processor 60 to the velocity profiler 74 includes a sequence of FNC data blocks. The FNC data blocks frequently, but not necessarily, bear a one to one relationship with NC source blocks. An FNC data file is primarily comprised of a sequence of FNC motion data blocks, i.e. data blocks which cause motion in at least one actuator. However, an FNC data file also typically includes some non-motion data blocks, which contain control information. An FNC data file is preferably generated in binary form with feedforward processor 60 supplying a bit string to machine control unit 70.

A typical FNC motion data block, as set forth in Table I, defines a specific velocity profile 80 for a path segment. A "path segment" as used herein refers to a linear portion of a path to be traversed by a machine member. Note that a single data block of the NC part program can define one or more path segments. For example, a single NC data block can define a circular path which the feedforward processor 60 will dissect into many FNC data blocks, each specifying a short linear path segment.

TABLE I

| | |
|---|---|
| SEQ_NO = | 3 |
| TRACE = | 0x0 |
| DEP_INT[0] = | −32 |
| DEP_FRAC[0] = | 25600 |
| COMD_VEL[0] = | −9602 |
| DEP_INT[1] = | 44 |
| DEP_FRAC[1] = | 37888 |
| COMD_VEL[1] = | 13215 |
| NOM_RATE = | 8861 |
| NUM_SAM = | 64 |
| IATTEN = | 203 |
| SATTEN = | 32767 |
| FATTEN = | 203 |
| ACC_NSAM = | 31 |
| DEC_NSAM = | 31 |
| TERMCODE = | 2 |

Figure 4A:
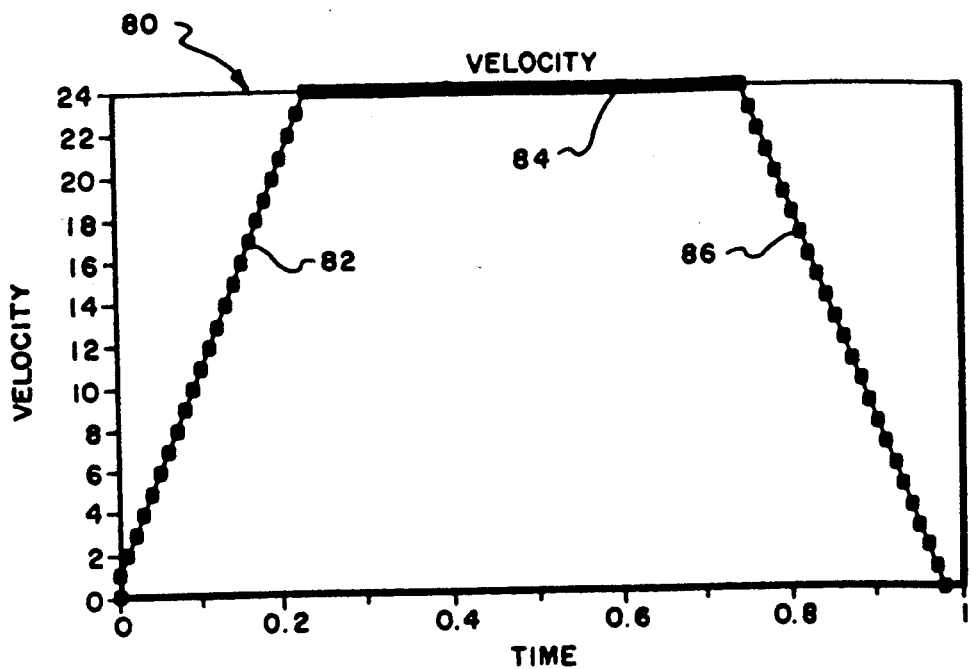
FIG. 4A depicts a typical velocity profile curve for an exemplary data block and FIG. 4B depicts a corresponding position profile.
Figure 4B:
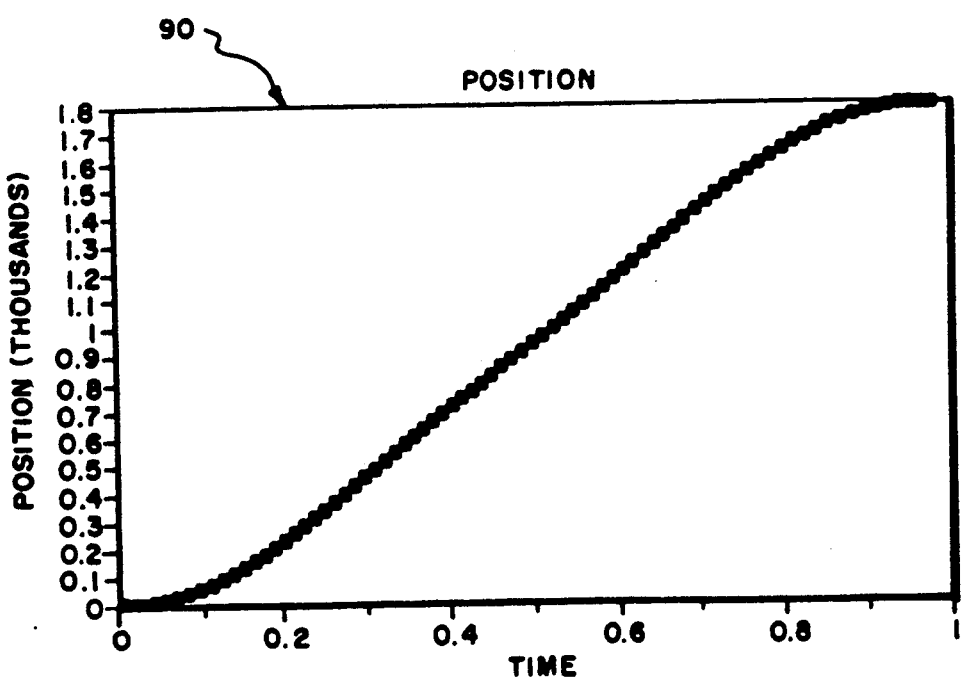

The FNC data block of Table I is comprised of various items, which can be interpreted best with reference to the exemplary velocity and position profiles of FIGS. 4A and 4B:

The first item is "SEQ_NO" which identifies the sequence number of the source block in the NC part program which fathered this FNC data block. The sequence number is included so that it can be displayed to the operator during part program execution, providing him with some indication of where he is in the program. In some cases, an NC program block may father numerous FNC blocks, as in the case of circular arcs, each of which will therefore carry the same sequence number, either expressly or by implication.

The second item "TRACE" is a software debugging trace tool of little significance to this discussion.

The position information supplied to synthesizer 72 includes items "DEP_INT[0]" and "DEP_FRAC[0]" which are respectively the integer and fractional parts (e.g. sixteen bits each) of the departure motion data to be output on axis O (e.g. X axis) for each sample. The MCU only uses the integer part on each iteration, and adds the fractional part to a running accumulation, adding carries (if any) to the integer part. This interpolation approach assures that the machine member will be moved the correct number of motion increments, all evenly spaced.

The velocity information supplied to profiler 74 includes item "COMD_VEL[0]", which is the nominal commanded velocity of axis 0 (the X axis). Generally this value is simply the axis departure distance within the block divided by the block execution time, then scaled as appropriate for the output device. This value will be attenuated downward at the block ends to accomplish velocity profiling.

It should be noted that the exemplary FNC data block depicted in Table 1 also includes motion data, i.e. DEP_INT[1], DEP_FRAC[1], and COMD_VEL[1] for axis 1 (Y axis). If motion were to concurrently take place along other axes, N, then the FNC data block would include still additional DEP_INT[N], DEP_FRAC[N] and COMD_VEL[N] items for each of those axes.

The item "NOM_RATE" is a numeric value defining the execution time of the samples in the block. In an exemplary implementation, 8192 corresponds to a sample execution time of 0.0147 seconds, while 16383 yields 0.007085 seconds, with intervening values proportional.

The "NUM_SAM" item is the number of "samples" comprising this block. In a preferred implementation, the NUM_SAM item always has a value which is some power of two, e.g. within the range $2^0$-$2^{23}$. The NOM_RATE and NUM_SAM together define the execution time of an FNC data block.

The next three items comprise velocity attenuation values (shape information) from the nominal rate. The initial attenuation IATTEN thus defines the initial velocity, the constant attenuation SATTEN defines the constant velocity (e.g. portion 84 of FIG. 3), and the final attenuation FATTEN defines the final velocity. These three values describe the attenuations extant at inflection points of the velocity profile curve (calculated so that the velocity of an axis actuator remains roughly constant across a block boundary).

Coupled with the attenuation values is further shape information comprising the number of acceleration and deceleration samples (i.e. ACC_NSAM and DEC_NSAM) to be used for the acceleration and deceleration portions of the velocity profile. In the exemplary data block of Table I, 31 samples are used to accelerate from an initial attenuation of 203 up to an attenuation of 32767. Deceleration then occurs in 31 samples to a final attenuation of 203.

Thus, in the exemplary FNC data block represented in Table I, the full velocity profile is comprised of 64 samples, with 31 samples being used for acceleration and another 31 samples being used for deceleration. For the 2 samples in between, the velocity will remain constant at a level dictated by the NOM_RATE value (8861) and the SATTEN value (32767).

The last item in Table I is TERMCODE. Several of the bits of the data word of this item may have significance; e.g. they may signal the end of an NC motion block and/or a planned or optional stop block and/or an end of program.

FIG. 4A illustrates the velocity profile produced by executing the FNC data block of Table I. FIG. 4B illustrates the position profile corresponding to FIG. 4A which it will be noted represents the integral of the velocity profile.

Figure 5A:
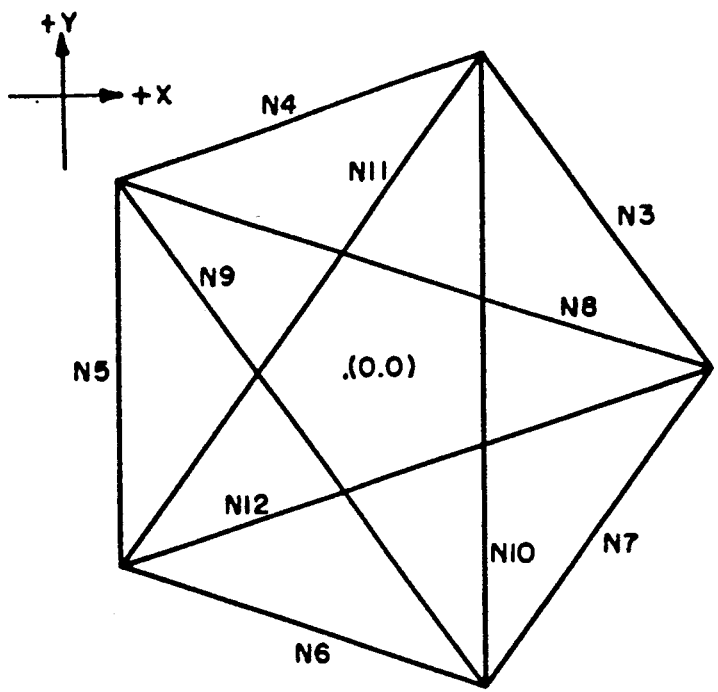
FIG. 5A depicts an example of a 2-axis tool path comprised of straight line path segments and FIGS. 5B and 5C respectively depict velocity profiles with respect to the X and Y axes.

Attention is now directed to FIG. 5A which illustrates a simple exemplary two axis (X,Y) path to be traversed by a machine member. Note that the path is comprised of ten successive path segments (denoted N3 through N12) of various lengths which intersect one another at corners of various angles.

Appendix A hereto sets forth both the source NC part program (PRIMEPLOT.NC) and the FNC data file (PRIMEPLOT.LST) produced therefrom to cause a machine member to traverse the path depicted in FIG. 5A. Note that the FNC data file of Appendix A includes one data block for each path segment N3-N12. Each such data block defines a velocity profile for each of the X and Y axes. Note, for example, that the data block having sequence number (SEQ_NO)3 is identical to the previously discussed exemplary data block of Table I. When the data blocks of Appendix A are executed by a machine control unit in accordance with the present invention (FIG. 7), X and Y axis actuators will be driven in accordance with the velocity profiles represented by the successive data blocks, as illustrated in FIG. 5B and 5C.

Figure 5B:
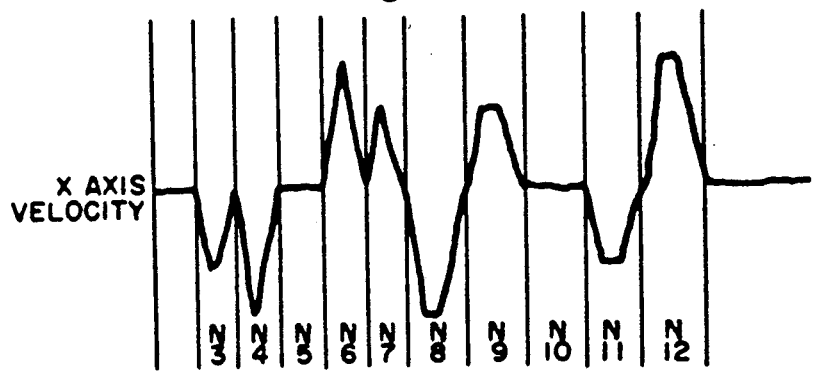
Figure 5C:
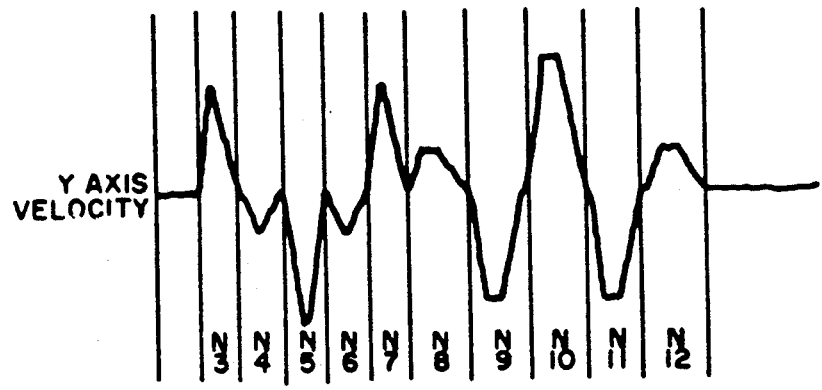

Note in FIG. 5B and 5C that the velocity profiles for path segments N3-N7 are comprised almost exclusively of acceleration and deceleration portions with no intermediate constant velocity portions. This indicates that these path segments are too short to permit the actuator to accelerate to the nominal feed rate before it must start decelerating to negotiate the next corner. However, note that the velocity profiles for the longer path segments N8-N12 do include intermediate flat tops representing constant velocity portions.

Figure 7:
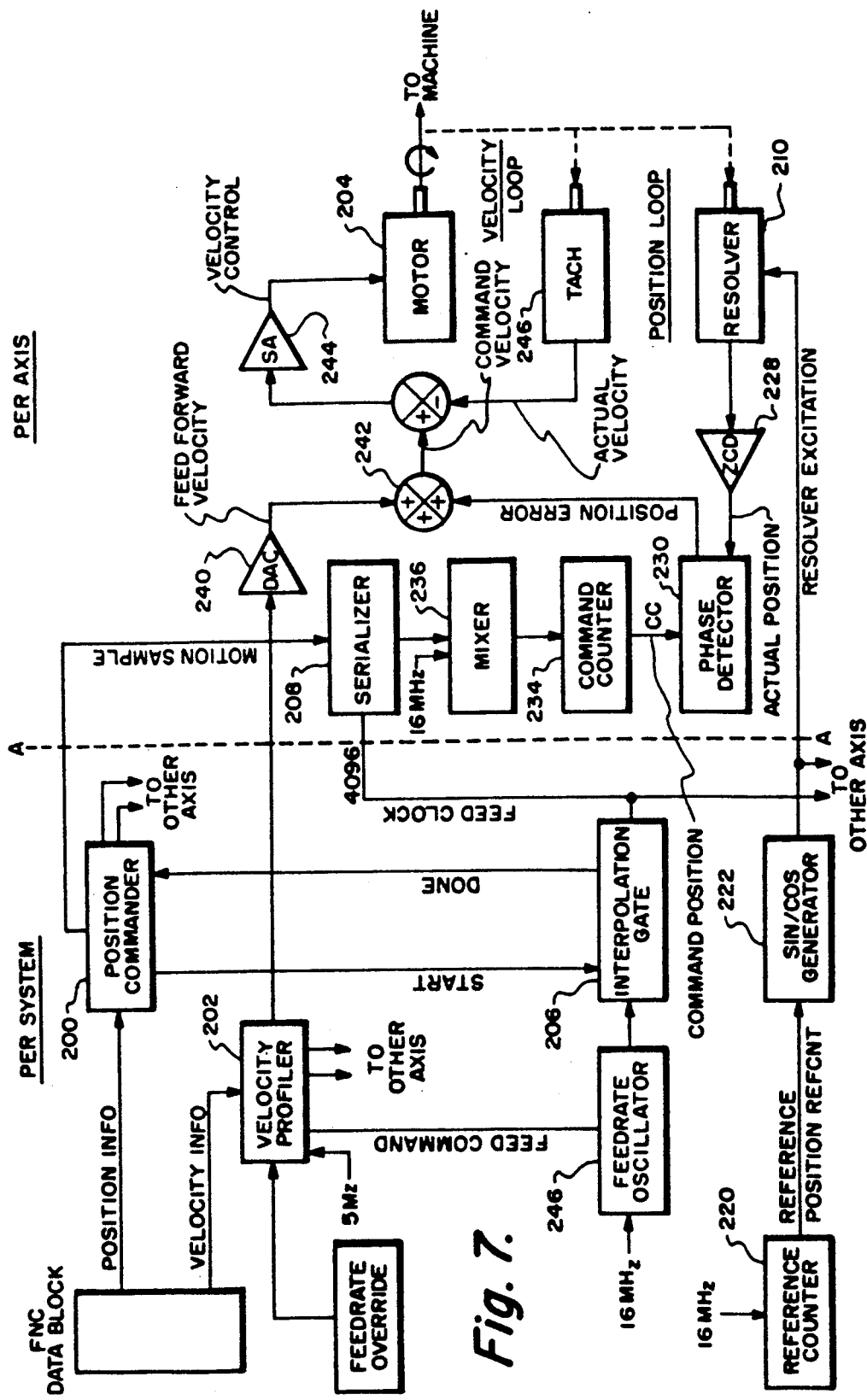
FIG. 7 is a block diagram of a preferred embodiment of a machine control unit in accordance with the present invention.

Appendix A shows both a conventional NC part program (PRIMEPLOT.NC) describing the path depicted in FIG. 5A as well as a listing of an FNC data file (PRIMEPLOT.LST) generated from that part program for controlling a machine control unit in accordance with the present invention (e.g. FIG. 7). In the preferred system implementation depicted in FIG. 1, the FNC data file is generated by running a conversion program, denominated NCTOFNC, which enriches the conventional NC part program input data with feedforward and velocity profile information.

It can be noted that in executing the exemplary path of FIG. 5A, the X and Y axis velocities decelerate to zero at the end of each path segment N3-N12. However, it should be understood that in executing paths with larger angle intersections (i.e. more obtuse) the velocity would not come to rest but rather would only decelerate to the extent necessary to negotiate the intersection.

Figure 6A:
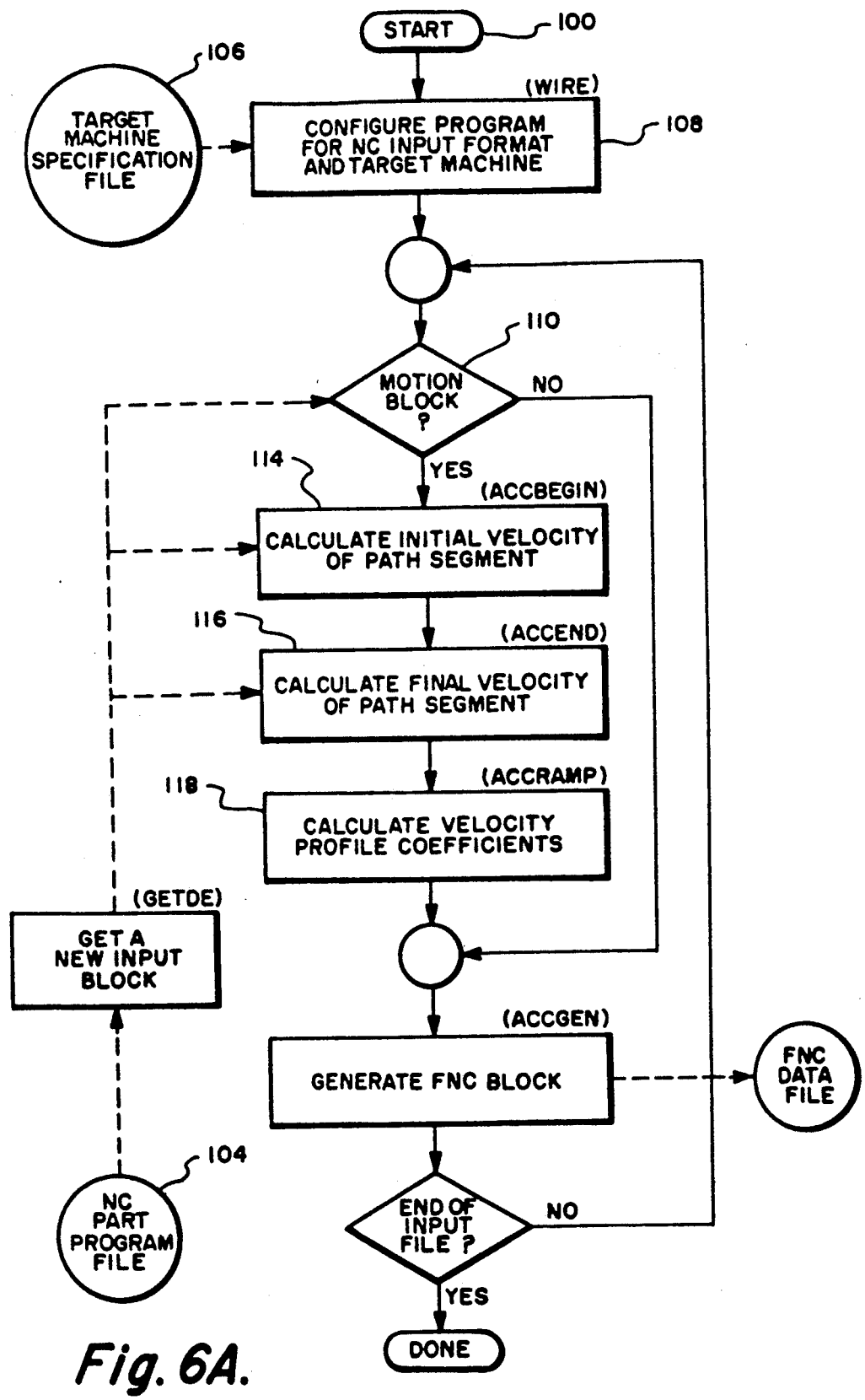
FIGS. 6A,B,C are software flow charts describing the operation of a preferred implementation for converting conventional NC data files to FNC data files.
Figure 6B:
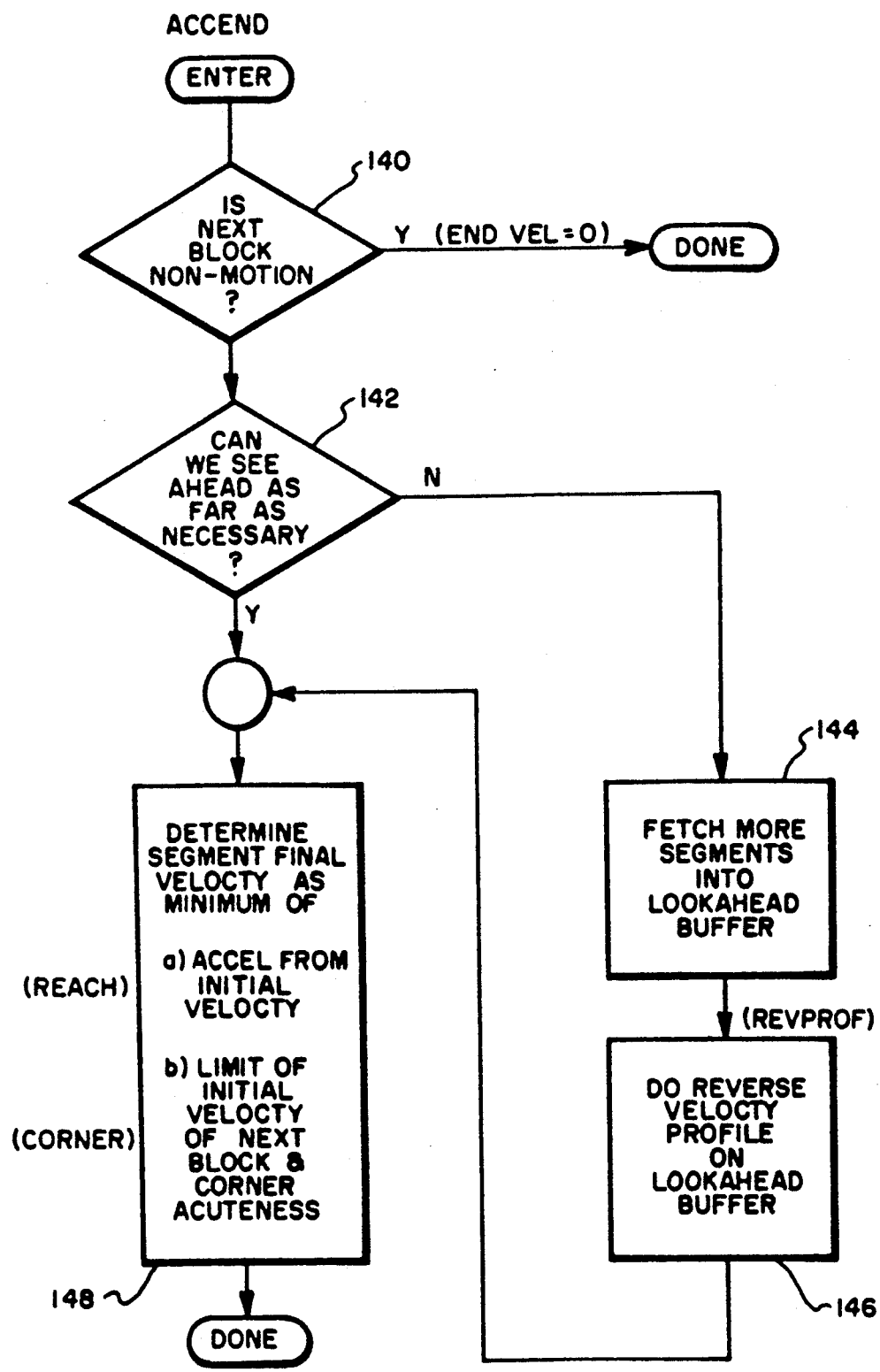
Figure 6C:
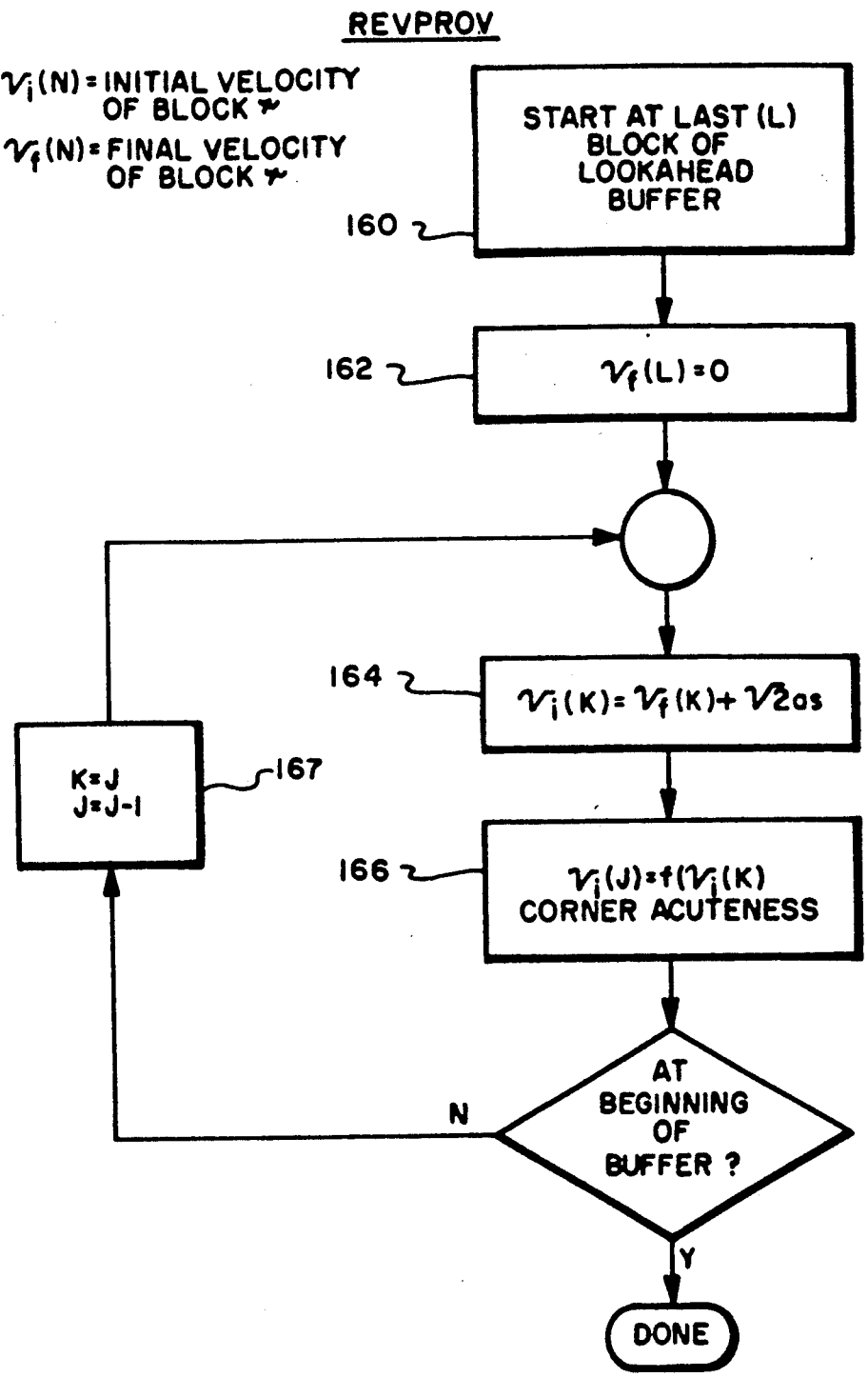

FIG. 6A comprises a high level flow chart generally describing the NCTOFNC program and showing the significant subroutines therein. FIG. 6B constitutes a flow chart of a particularly significant subroutine (ACCEND) for calculating the final velocity at the end of the acceleration portion of a path segment. FIG. 6C comprises a flow chart describing a subroutine (REVPROF) which is executed in ACCEND for developing a reverse velocity profile for putting lookahead data in a queue of motion data blocks and working backward through the queue so that blocks in front of the queue get forward visibility of corners, straightaways and stops.

Appendix B describes in detail the NCTOFNC program and the subroutines WIRE, ACCBEGIN, ACCEND, ACCRAMP, ACCGEN, GETDB, REVPROF, REACH and CORNER.

Attention is now directed to FIG. 6A which, in flow chart form, depicts the NCTOFNC program. When initiated 100, the program first checks that the format of the program call was correct, then verifies that the two input files (i.e. source NC part program 104 and target machine specification 106) are available, so that an FNC data file can be created.

The program then "wires" itself up 108 to accept the particular format of the input NC part program 104 to produced an FNC data file appropriate for the target machine; this is done by interpreting the data in the specification file 106; (see the subroutine WIRE. in Appendix B for more detail).

The program then enters a continuous processing loop, reading input NC data blocks and outputting FNC data blocks. At least one FNC block is output for each NC block, but certain NC blocks can father many FNC blocks. The program attempts to output FNC blocks as soon as possible after reading an input NC block, but often must look ahead several NC blocks in order to generate an FNC block. This continuous processing loop proceeds as follows:

First we determine whether there is any motion at all in the input NC block 110; if not, we bypass the motion calculations and go right to subroutine ACCGEN 112 to generate the FNC block. If there is motion, we execute subroutine ACCBEGIN 114 to calculate the initial velocity of the block; commonly at the beginning of each data block, the movable member is exiting a corner entered at the end of the previous data block, and the entry rate affects the exit rate. Details of the subroutine ACCBEGIN are in Appendix B.

Knowing that we have a motion block, and the initial velocity of the block, we then execute subroutine ACCEND 116 to calculate the end velocity of the block. To calculate the end velocity subroutine 116 looks forward in a queue of NC data blocks far enough that looking further would serve no purpose. For example, if the very next block has no motion, we know that we must stop at the end of the current block. If the very next block is short, we look beyond it in case there is a stop or corner upcoming that would have an effect on the current block. (See the subroutine ACCEND in Appendix B for more lookahead detail).

The subroutine ACCRAMP 118 is then executed to calculate the velocity profile of the current block based on the known nominal velocity and the previously calculated initial and end velocities. The profile is calculated such that we will always be accelerating at a maximum rate toward the nominal velocity, be at the nominal velocity, or decelerating at a maximum rate from it. The normal phases to go through are acceleration, constant, deceleration, but in some cases phases can be skipped. If, for example, a path segment is too short to allow acceleration to full speed, then the constant velocity phase will be skipped. (See ACCRAMP of Appendix B for more detail of velocity profiling).

The FNC data block is then generated by subroutine ACCGEN 112, which comprises a simple matter of organizing and outputting it. (See ACCGEN of Appendix B).

A decision (119) is then made to determine whether we have reached the end of the input NC file. If not, processing loops back to decision block 110.

The subroutines that require NC input data use subroutine GETDB (Appendix B) to fetch a new segment data block. If the NC input program calls for a higher order path (e.g., a circle) GETDB will break it into linear segments.

Attention is now directed to FIG. 6B which illustrates, in flow chart form, the operation of subroutine ACCEND 116 for calculating the end velocity of a path segment. This subroutine, which is explained in detail in Appendix B initially determines 140 whether the next input NC data block is a motion or a nonmotion block. If it is a nonmotion block, then the subroutine ACCEND terminates. On the other hand, if it is a motion block, then decision block 42 determines whether there are already a sufficient number of blocks in the lookahead queue (buffer) to enable the end velocity to be calculated. If not, then operation proceeds to 144 which fetches more NC data blocks from the NC part program input file and places them in the lookahead buffer. Thereafter, a reverse profile (REVPROF) subroutine 146 is executed. The REVPROF subroutine is explained in detail in Appendix B and briefly in the flow chart of FIG. 6C. Its function is to work backwards through the queue of motion data blocks in the lookahead buffer so that the blocks at the front of the queue get forward visibility of corners, straightaways, and stops.

After execution of the subroutine REVPROF, operation in FIG. 6B proceeds to 148 which executes two subroutines REACH and CORNER, both of which are explained in detail in Appendix B. The function of the REACH subroutine is to determine the maximum velocity at the end of a path segment, given some dynamic parameters. The function of the CORNER subroutine is to calculate the entry speed of a corner, i.e. the intersection of two successive path segments. Then subroutine 148 then selects the lower of the two velocities calculated as a consequence of the REACH and CORNER subroutines.

FIG. 6C depicts the REVPROF subroutine which is explained in greater detail in Appendix B. As mentioned, the reverse profile subroutine works backwards through a queue of motion blocks in the lookahead buffer so that the blocks in front of the queue, i.e. the blocks to be executed first, effectively get forward visibility of subsequent corners, straightaways, and stops. In executing the REVPROF subroutine, operation starts at the last block of the lookahead buffer 160. The final velocity of the last block is set equal to zero 162. An iterative loop is then entered, in which the initial velocity and end velocity of each motion block, i.e. path segment, is calculated, using the previously calculated initial and end velocities of later blocks in the lookahead buffer. Thus, operation 164 determines the initial velocity of block K as a function of the final velocity of block K and the permissible acceleration and length of the segment. Operation 166 determines the final velocity of block J as a function of the initial velocity of block K and the acuteness of the corner angle. Operation 167 then moves back one step in the lookahead buffer queue.

Attention is now directed to FIG. 7 which illustrates a preferred machine control unit in accordance with the invention especially configured to properly utilize the FNC data blocks generated by the feedforward processing means program NCTOFNC described by FIG. 6A.

In FIG. 7, the items to the left of the line A—A serve the entire MCU. Everything to the right of the line A—A is replicated for each axis. In a typical system as depicted in FIG. 1, there will be several MCU's, each having several axes of motion.

The FNC motion data blocks contain both position data (i.e. DEP_INT and DEP_FRAC) and velocity data (i.e. COMD_VEL and attenuation items). These data are respectively supplied to function blocks 200 (position commander) and 202 (velocity profiler) which can be implemented solely in hardware but preferably comprise software driven microprocessors.

The Position Commander 200 is concerned with driving each motion actuator 204 along its axis, with little concern for its rate of progress. This function is paced by an interrupt from an Interpolation Gate 206, the interrupt occurring when processing of the previous path segment has been completed. The input data to the Interpolation Gate is NOM_RATE which defines the execution time for samples in the block. The magnitude of the integer (DEP_INT) and fractional (DEP_FRAC) components of each axis motion within the block are supplied to Position Commander 200. At each interrupt, the fractional part of the axis motion is added to a running accumulation, and a 'carry' is generated which is added to the integer part, and the resulting integer part is written out to a Serializer 208. When this has been done for all axes, a "start" command is issued to the Interpolation Gate 206 which executes the motion, then interrupts, indicating need for new motion commands. More specifically, the function of the Serializer 208 is to generate a pulse for each increment of motion desired. In a preferred embodiment, a motion increment, or "count", is equal to 1/5000 of an electrical revolution of a position feedback RESOLVER 210. The Position Commander 200 loads the Serializer 208 with a parallel data word and then a burst of 4096 "feed clock" pulses from the Interpolation Gate 206 is applied to the other input of the Serializer. The resulting output is a serial pulse train of equally-spaced "count" pulses, equal in number to the magnitude of the parallel word loaded into the Serializer. The Serializer is preferably a 12-bit pulse-rate multiplier and is normally running all of the time; as soon as one burst of 4096 feed clock pulses has finished, the Serializer is loaded with a new data word and the Interpolation Gate 206 is restarted, all of which happens so quickly as to appear instantaneous relative to the burst time. Thus, for constant axis speed, the Serializer 208 outputs a constant frequency pulse train equal to the product of the data word loaded into the Serializer and the frequency of the feed clock pulses supplied by Interpolation Gate 206.

Feed clock pulses are generated by the Feedrate Oscillator 216, which generates pulses at a rate proportional to a "feed command" word written to it by the Velocity Profiler 202. The Feedrate Oscillator can comprise a 16-bit pulse-rate multiplier preceded by a modulo-7 frequency divider which divides down a precision 16 MHz clock to provide a high precision, wide range adjustable frequency source.

As noted, the function of the Interpolation Gate 206 is to pass a burst of 4096 pulses from the Feedrate Oscillator 216 whenever commanded to do so by receipt of a "start" command from the Position Commander 200. When the 4096 pulses have been passed, the gate is closed and a "done" signal is sent to the Position Commander.

In the preferred embodiment, all position data (both commanded and actual) are represented by the relative phase of digital square waves with a nominal period of 500 usec (2 KHz). In order to provide a base reference for position, a Reference Counter 220 divides a precision 16 MHz clock by 8000 to create a symmetrical digital square wave.

The "reference position" from the Reference Counter 220 serves as input to the SIN/COS Generator 222 which creates analog sine and cosine waves which are used to excite the feedback Resolver 210. The sine output of Generator 222 is identical in frequency and phase to the output of Reference Counter 220, while the cosine wave is shifted by 90 degrees. The SIN/COS Generator 222 preferably comprises a table lookup read only memory (ROM) and precision digital-to-analog converter (DAC) for both sine and cosine. The resulting sine and cosine signals have precise amplitude and phase, assuring high accuracy from the position feedback Resolver 210.

The Resolver 210 provides an indication of actual machine axis position. It can be an electromechanical device with a rotational input shaft coupled (directly or indirectly) to the motion actuator 204. The output of the Resolver 210 is a sinusoidal waveform whose phase (relative to its "resolver excitation") is proportional to the rotational position of its input shaft. Resolvers are well known and can be fabricated for various sensitivities; e.g. on a two-pole configuration, the output wave is shifted 360 degrees for every full revolution of the input shaft.

The sine wave output of the Resolver 210 is converted into a digital wave of identical phase by the Zero Crossing Detector (ZCD) 228. Basically, this is simply a high-gain amplifier driven to saturation, but to prevent electrical noise from false-triggering the Phase Detector 230, the ZCD preferably includes a digital phase-locked loop filter.

Position information is represented as the phase of a digital square waves, so position error is seen as the phase difference between square waves respectively representing actual and commanded positions. The Phase Detector 230 compares the commanded position with the actual position, and generates a DC reference signal with magnitude proportional to the difference. If this DC reference signal is used to command the speed of actuator 204, the result is that the actuator is caused to move in a direction to reduce the error (difference) between the commanded and actual positions.

The Phase Detector 230 acts to generate a DC signal of one level when the sense of the two waves are the same, and generates a second level when they are different; the average of the two levels (obtained by RC filtering) is the output of the Phase Detector, which varies smoothly with changes in phase difference.

When there is no error, the output voltage is zero; in this condition, the command and actual position signals differ by 90 degrees, and the unfiltered output signal is a 4 KHz signal switching between equal plus and minus voltages. (NOTE: since our system uses the feedforward velocity signal, to be discussed further, theoretically there should be no error between command and actual position, so the simple approach described above would be sufficient even though it has a limited error range of $+/-90$ degrees. In actuality, however, there are instances where it is desired to have increased error range; in a preferred embodiment, this is accomplished by the use of a Phase Detector which counts full rotations of phase error, and thus has a much higher range).

The commanded position is contained in the phase (relative to the reference counter) of a digital square wave generated by a Command Counter 234. The Command Counter 234 is a modulo-5000 digital frequency divider nominally excited by a 10 MHZ frequency from the mixer 236. In the no-motion condition, the output of the Command Counter 234 is exactly 2 KHz, as is the output of the Resolver 210. By increasing or decreasing the input frequency to the Command Counter, the output phase, or command position can be smoothly shifted, thus commanding axis motion. When the input frequency returns to the nominal 10 MHz level, phase shifting (and machine motion) stops.

The Mixer 236 generates the input frequency for the Command Counter 234. In the no-motion condition, it provides a 10 MHz frequency derived by multiplying a precision 16 MHz clock by $\frac{5}{8}$. (Note: since the Reference Counter divides down the same clock as the Mixer and Command Counter, they maintain a fixed phase relation in the absence of commands to change commanded position.) A second input to the Mixer is the output of the Serializer 208, which provides two signals: a sign bit and a serial pulse train of motion "counts". Counts are added (subtracted) from the nominal 10 MHz output of the MIXER to produce the signals for the Command Counter 234.

A DAC (Digital to Analog Converter) 240 provides a DC reference signal proportional to the value impressed upon it by the Velocity Profiler 202. This is the feedforward velocity signal determined by the NCTOFNC program and continually indicates the desired instantaneous speed of the axis actuator 204. This desired velocity signal is summed with the output of the Phase Detector 230 (which is the position error signal, theoretically always zero) at the summing junction 242 to create an axis commanded velocity signal. A velocity loop comprising a servo amplifier 244, axis motion actuator 204, and velocity feedback TACHometer 246 act to follow this speed command precisely.

The Velocity Profiler 202 shapes the velocity-versus-time curve of axis motion in accordance with curve coefficients contained in the input FNC data block. This is a software procedure executed periodically, e.g. every 5 milliseconds, paced by a precision interrupt (though preferably subordinated to the Position Commander function). Shaping of the velocity profile is accomplished by modulating both the frequency of the Feedrate Oscillator 216 and scaling the "feedforward velocity" of the axis DAC 240. Reducing the value of both values by half, for example, would cut axis speed in half.

APPENDIX A

```
$
$
$
$ CAT PRIMEPLOT.NC
N1G90G01F250.0
N2G92X30000Y0
N3X9270Y28531
N4X-24270Y17633
N5X-24270Y-17633
N6X9270Y-28531
N7X30000Y0
N8X-24270Y17633
N9X9270Y-28531
N10X9270Y28531
N11X-24270Y-17633
N12X30000Y0
M30
$
$
$
$
$
$
```

NC PART PROGRAM

```
$ CAT PRIMEPLOT.LST
SEQ_NO      =       1
TRACE       =       0x0
NOM_RATE    =       12345
NUM_SAM     =       1
TERMCODE    =       2

SEQ_NO      =       2
TRACE       =       0x0
NOM_RATE    =       12345
NUM_SAM     =       1
TERMCODE    =       2

SEQ_NO      =       3
TRACE       =       0x0
DEP_INT[0]  =       -32
DEP_FRAC[0] =       25600
COMD_VEL[0] =       -9602
DEP_INT[1]  =       44
DEP_FRAC[1] =       37888
COMD_VEL[1] =       13215
NOM_RATE    =       8861
NUM_SAM     =       64
IATTEN      =       203
SATTEN      =       32767
FATTEN      =       203
ACC_NSAM    =       31
DEC_NSAM    =       31
TERMCODE    =       2

SEQ_NO      =       4
TRACE       =       0x0
DEP_INT[0]  =       -52
DEP_FRAC[0] =       26624
COMD_VEL[0] =       -15535
DEP_INT[1]  =       -17
DEP_FRAC[1] =       2048
COMD_VEL[1] =       -5048
NOM_RATE    =       8861
NUM_SAM     =       64
IATTEN      =       280
SATTEN      =       30346
FATTEN      =       162
ACC_NSAM    =       31
DEC_NSAM    =       33
TERMCODE    =       2

SEQ_NO      =       5
TRACE       =       0x0
DEP_INT[1]  =       -55
DEP_FRAC[1] =       6144
COMD_VEL[1] =       -16335
NOM_RATE    =       8862
NUM_SAM     =       64
IATTEN      =       201
SATTEN      =       29544
FATTEN      =       204
ACC_NSAM    =       33
DEC_NSAM    =       31
TERMCODE    =       2
```

FNC DATA FILE

```
SEQ_NO       =       6
TRACE        =       0x0
DEP_INT[0]   =       52
DEP_FRAC[0]  =       26624
COMD_VEL[0]  =       15535
DEP_INT[1]   =       -17
DEP_FRAC[1]  =       2048
COMD_VEL[1]  =       -5048
NOM_RATE     =       8861
NUM_SAM      =       64
IATTEN       =       172
SATTEN       =       30346
FATTEN       =       280
ACC_NSAM     =       33
DEC_NSAM     =       31
TERMCODE     =       2

SEQ_NO       =       7
TRACE        =       0x0
DEP_INT[0]   =       32
DEP_FRAC[0]  =       25600
COMD_VEL[0]  =       9602
DEP_INT[1]   =       44
DEP_FRAC[1]  =       37888
COMD_VEL[1]  =       13215
NOM_RATE     =       8861
NUM_SAM      =       64
IATTEN       =       203
SATTEN       =       32767
FATTEN       =       253
ACC_NSAM     =       33
DEC_NSAM     =       31
TERMCODE     =       2

SEQ_NO       =       8
TRACE        =       0x0
DEP_INT[0]   =       -42
DEP_FRAC[0]  =       26112
COMD_VEL[0]  =       -15536
DEP_INT[1]   =       13
DEP_FRAC[1]  =       50688
COMD_VEL[1]  =       5047
NOM_RATE     =       10953
NUM_SAM      =       128
IATTEN       =       172
SATTEN       =       32767
FATTEN       =       172
ACC_NSAM     =       45
DEC_NSAM     =       45
TERMCODE     =       2

SEQ_NO       =       9
TRACE        =       0x0
DEP_INT[0]   =       26
DEP_FRAC[0]  =       13312
COMD_VEL[0]  =       9602
DEP_INT[1]   =       -36
DEP_FRAC[1]  =       4096
COMD_VEL[1]  =       -13215
NOM_RATE     =       10953
NUM_SAM      =       128
IATTEN       =       203
```

```
SATTEN    =    32767
FATTEN    =    203
ACC_NSAM  =    38
DEC_NSAM  =    38
TERMCODE  =    2

SEQ_NO    =    10
TRACE     =    0x0
DEP_INT[1]  =  44
DEP_FRAC[1] =  37888
CMD_VEL[1]  =  16335
NOM_RATE  =    10953
NUM_SAM   =    128
IATTEN    =    164
SATTEN    =    32767
FATTEN    =    164
ACC_NSAM  =    47
DEC_NSAM  =    47
TERMCODE  =    2

SEQ_NO    =    11
TRACE     =    0x0
DEP_INT[0]  =  -26
DEP_FRAC[0] =  13312
CMD_VEL[0]  =  -9602
DEP_INT[1]  =  -36
DEP_FRAC[1] =  4096
CMD_VEL[1]  =  -13215
NOM_RATE  =    10953
NUM_SAM   =    128
IATTEN    =    203
SATTEN    =    32767
FATTEN    =    203
ACC_NSAM  =    38
DEC_NSAM  =    38
TERMCODE  =    2

SEQ_NO    =    12
TRACE     =    0x0
DEP_INT[0]  =  42
DEP_FRAC[0] =  26112
CMD_VEL[0]  =  15536
DEP_INT[1]  =  13
DEP_FRAC[1] =  50688
CMD_VEL[1]  =  5047
NOM_RATE  =    10953
NUM_SAM   =    128
IATTEN    =    172
SATTEN    =    32767
FATTEN    =    173
ACC_NSAM  =    47
DEC_NSAM  =    45
TERMCODE  =    2

SEQ_NO    =    12
TRACE     =    0x0
NOM_RATE  =    12345
NUM_SAM   =    1
MCODE     =    30
TERMCODE  =    3
```

APPENDIX B

```
***********************************
*                                 *
*         nctofnc.c               *
*                                 *
*   Convert NC part program to    *
*       FNC format                *
*                                 *
***********************************
```

FUNCTION:
    A part program in conventional Numerical Control (NC) format translated into a program suitable for execution by an ACC Machine Control Unit (MCU). The translation includes enriching the data with feedforward and velocity profiling information, permitting more optimal machine axis performance, including quicker cornering and better path accuracy.

USE:
    Execute this "main" program with three calling arguments:
The first argument is the name of the input Numerical Control part program; the second argument is the name you wish assigned to the output file that the NCTOFNC program creates; and the final argument is the name of a "specification" file, which provides the program with information describing how to interpret the input file and in addition provides information describing the characteristics of the target machine, including dynamic capabilities of each axis.

EXAMPLE:
        >nctofnc prime5.nc prime5.fnc example.spc

RESULTS:
    The expected result is a binary file in FNC format which has the name given in the second argument of the function call. If errors are encountered, they are written to the STDERR device.

DESCRIPTION:
    When initiated, the program first checks that format of the program call was correct, then verifies that the two input files (NC source and specification) are available, and that the output file can be created.

The program then "wires" itself up to accept the particular format of the input program and to output data appropriate for the target machine; this is done by interpreting the data in the specification file; see the function WIRE.C for more detail.

The program then enters a continuous processing loop, reading input NC blocks and outputting FNC blocks. At least one FNC block is output for each NC block, though there may be more. The program attempts to generate output blocks as soon as possible after reading an input block, but often must look several blocks ahead in the input data so as to permit the "lookahead" feature of the FNC system. This processing proceeds as follows:

First we determine whether there is any motion at all
in the block; if not, we bypass the motion calculations
and go right to output generation. If there is motion,
we calculate the initial execution rate of the block;
commonly at the beginning of the block we are exiting
a corner entered at the end of the previous block, and
the entry rate affects the exit rate. Details of this
function will be found in ACCBEGIN.C.

Knowing that we have a motion block, and the initial
execution rate of the block, we must calculate the end
velocity of the block, because when we know it, we have
all of the information necessary to calculate and output
the block. To calculate the end velocity, we look
forward in the data far enough that looking further
would have no point. If the very next block has no
motion, for example, we know that we must stop at the
end of the current block. If the very next block is
short, we look on beyond it in case there is some other
imminent stop or cornering constraint that would have
an effect on the current block. See the function
ACCEND.C for more lookahead detail.

The velocity profile of the current block can now be
calculated, as we know the beginning, end, and nominal
execution rates for it. A profile is calculated such
that we will always be accelerating at maximum
acceleration, or in constant (nominal) speed, or
decelerating at maximum deceleration. The normal
phases to go through are accel, constant, decel, but
in some cases phases will be skipped. If, for example,
there isn't distance enough to allow for full speed,
we will accelerate until we shift over to deceleration.
See ACCRAMP.C for more detail of velocity profiling.

The output block is now generated, which is a simple
matter of organizing and outputting it. See ACCGEN.C.

Now return to the beginning step.

The functions that read NC source input data use function
GETDB.C to fetch a new straight-line path segment. If the
NC source program calls for a higher order path (e.g., a circle)
GETDB will break it into linear path segments, returning an
additional one each time that it is called.

PRECAUTIONS AND UNUSUAL CONDITIONS:

*************************************************************
*/
include <stdio.h>
include "nctofnc.h"
include "accel.h"

```
main(argc, argv)
int argc;
char *argv[];
{
        extern BOOL endfile;
        extern BOOL endprog;
        extern FILE *infile, *outfile;
        extern UCOUNT line_no;
        FILE *fopen();

/******/ if (argc != 4) {    /* Not enough input arguments */
                accerr(0);
                exit (NO);
        }

/* Initialize the system */
        fncinit();

/* "Wire" the system to accept the proper input
                format by translating the specified specification
                file */
        if (! wire(argv[3]))
                exit(NO);

/* Open input file and create output file */ if ((infile = fopen(argv[1], "r")) == NULL) {
                accerr(1, argv[1]);    /* Can't open */
                exit(NO);
        }
        if ((outfile = fopen(argv[2], "w")) == NULL) {
                accerr(2, argv[2]); /* Can't create */
                exit(NO);
        }
                /* Prime the scanner with a call to scanchar */
        line_no = 0;
        scanchar();

/* Process the part program */
        do {
                        /* Determine the attenuation factor
                           for the initial part of the block */
                if (! accbegin())
                        exit(NO);

if (! endfile) {

/* Determine the attenuation factor
                           for the end of the block */
                        if (! accend())
                                exit (NO);
```

```
                /* Calculate the acc/dec ramps */
                if (! accramp())
                        exit(NO);

}

/* Generate the output block */
        if (! accgen())
                exit(NO);

} while (! (endfile || endprog));

/* See if the program was properly terminated
           or if it ran off the end */
if ( !endprog)
        accerr(40);

exit(YES);      /* Closes all files */
}
```

```
/*   *****************************    *********
     *                              r          *
     *         wire.c.                         *
     *                                         *
     * Configure the NC to FNC function        *
     *     Machine Control Unit Host           *
     *                                         *
     *******************************************
```

FUNCTION:
    The FNC system accepts as input NC part programs that
    may have been targeted for controls with differing
    data input formats and generates outputs tuned to the
    physical characteristics of different machines. It is
    not desired to write specific translators for each
    combination, so this function configures the system for
    the specific format/machine combination. It does this
    by reading the contents of a user-specified "specification"
    file and using this information to establish appropriate
    operating conditions. There is thus a different
    specification file for each combination.

Included in a specification file is information relative
    to the format of the input data (e.g., axis designation
    letters, how many characters before/after implied decimal
    points, code values for certain functions, defaults for
    interpolation modes, etc.), and machine characteristics
    (feedback gearing, maximimum velocities, acceleration
    capabilities, chord-height tolerance, etc.). It is
    obvious that it is now possible for a given machine with
    the FNC system to be able to accept input programs in
    a variety of formats; a different specification file is
    called for upon program initiation.

It is intended that configuring the system for a specific
    situations should be easily accomplished by non-programming
    personnel; thus the WIRE function accepts text specification
    files, easily understood and edited using commonly available
    editing tools.

USE:
    SYNOPSIS:
        BOOL wire (filename);
            char *filename;   (Specification file ).

An example specification file serves as a guide to the
    input format required.

RESULTS:
    A letter table is built up which will vector the translater
    to decoding routines appropriate to that letter. In addition,
    data structures are filled with formatting specifications
    for each letter.

Errors in the specification file are written to stderr.

The function returns NO if errors were encountered.

PRECAUTIONS AND UNUSUAL CONDITIONS:

```
*************************************************************
*/
include <stdio.h>
include "nctofnc.h"
#include "wire.h"

BOOL wire(filename)
char *filename;
{
        FILE *fopen();
        extern FILE *infile;
        extern UCOUNT tok_cat;              /* Token category */
        extern UCOUNT tok_subcat;           /* token subcategory */
        extern UCOUNT tok_index;            /* Token index */
        extern char token[80];              /* Token itself */
        extern UCOUNT line_no;              /* Source line number */

BOOL errflag;
        BOOL done;

/*********/
#if WDBGLEV > 0
        printf ("wire: specification file = %s\n", filename);
endif /* Open the specification file */
        if ((infile = fopen(filename, "r")) == NULL) {
                accerr (3, filename);    /* can't open */
                return (NO);
        }

/* Prime the scanner with a call to scanchar */
        scanchar();

/* Interpret individual sentences */
        errflag = NO;
        for (done = NO; done == NO;) {
                w_scan();
                switch (tok_cat) {
                case ENDTOK:
                        done = YES;
                        break;
                case IDFTOK:
                        /* register definition */
                        if(! w_let())
                                errflag = YES;
                        break;
```

```
        case KWDTOK:
                switch (tok_subcat) {
                case CHORD_HT:
                        if ( ! w_chord())
                                errflag = YES;
                        break;
                default:
                        break;
                }
                break;
        default:
                errflag = YES;
                accerr( 17, token, &line_no);
                break;
        }

}
    fclose(infile);
    return( !errflag);
}
```

```
/*       *******************************  *********
         *                                         *
         *       accbegin.c                        *
         *                                         *
         * Calculate start speed of block          *
         *    Machine Control Unit Host            *
         *                                         *
         *******************************************
```

FUNCTION:

The first step in developing a velocity profile for a
motion is to determine the initial motion rate. That is
the function of this module. When this function is called,
we are either about to start a series of path segments or
are in the midst of a series.

If we are about to start a series of path segments, we are
beginning at a stopped-motion condition. We fetch a new
block to process; if this block has no motion, we
have nothing further to do with it, so we pass it along and
retire until called upon again. If there is motion in the
block, we determine how much we have to attenuate the programmed
velocity of the block such that the initial step from zero
speed to this attenuated value is within the range of
capability of all the axis that are called upon to move,
and one of these axes will be stressed to its limit. The
attenuation factor is the result of the function.

If we are in the midst of a series of path segments, this
segment will already have been analyzed during calculation
of the preceding block, as the intersection of the two
segments comprises a corner, so the attenuation factor will
already be recorded within the block, so we have nothing
to do.

USE:

SYNOPSIS:

COUNT accbegin( );

RESULTS:

Returns YES on success, else NO.

An initial attenuation factor of the path segment is
calculated and stored within the block. If
there is no block at the front of the queue,
one is fetched.

Sets the global end-of-file flag if the end of
the file is hit.

PRECAUTIONS AND UNUSUAL CONDITIONS:

```
************************************************************
*/
include <stdio.h>
```

```c
#include "nctofnc.h"
include "accel.h"

BOOL accbegin()
{
        extern BOOL endfile;                /* set it true at end */
        extern unsigned short last_atten;
        extern struct QCB db_q;             /* Queue of active blocks */
        struct DATA_BLOCK *active;          /* block in work */
        int n;

/********/
                /* If there is no datablock on the queue,
                        go get one */
        if (! db_q.first) {
                n = getdb();
                if (n == NO)
                        return (NO);
                else if (n == EOF){
                        endfile = YES;
                        return (YES);
                }
                active = db_q.first;

/* As this is a new block, it must be
                                not have had any lookahead done, so
                                it is lookahead limited */
                active->look_limited = YES;

}
        else
                active = db_q.first;

if (active->no_motion == YES)
                return(YES);    /* No dynamics involved */

/* If there is no initial attenuation
                           value in the datablock, it must start
                           at zero speed.  If this is the case
                        record an initial value which is
                        the maximum rate-of-change of
                        the attenuator, which represents an
                        acceptable step */ if (active->iatten == 0)
                active->iatten = active->max_atten_rate;
        return(YES);
}
```

```
/*      *****************************
        *                           *
        *       accend.c            *
        *                           *
        * Calculate block end velocity *
        * Machine Control Unit Host *
        *                           *
        *****************************
```

FUNCTION:
    Calculates an attenuation factor to be applied at the
    end of the current path segment such that we are going
    as fast as we can consistent with various applicable
    constraints, of which there are three:

The first constraint is the sharpness of the
        corner we are traversing; if we go too fast we
        will overstress the axes.  See the function
        CORNER.C The second constraint is upcoming corners (or
        stops) further downstream; we have to be sure that
        we are not going too fast to slow down for them.
        This is a complex problem; the solution is to
        read a number of path segments in and store them in a
        "lookahead" buffer (possibly still containing
        segments from the last iteration), and work our
        way backwards (performing a "reverse velocity
        profile") for anticipitory stopping (see REVPROF.C).
        The maximum number of lookahead segments that this
        system uses is arbitrarily 100, which is more than
        adequate for all anticipated usage.  Lookahead is
        a critical component of the FNC system.

The last constraint is the rate that we can acheive
        in the forward direction, given the initial rate
        (which is already in the block).  The final speed
        is based on working the most limiting axis at
        its maximum stress (acceleration).  See the
        function REACH.C.

The final rate that results from this function is the
    rate based upon the lowest constraint.

USE:
        SYNOPSIS:

BOOL accend()

RESULTS:
        Returns YES if successful.

The calculated attenuation value is recorded in the
        block structure.  Usually it is necessary to look
        forward in the data, so additional blocks are appended to the working queue.

PRECAUTIONS OR UNUSUAL CONDITIONS:

```
*****************************************************
*/
include <stdio.h>
include "nctofnc.h"
include "accel.h"

BOOL accend()
{
                /* Queue of active blocks */
        extern struct QCB db_q;
                /* Blocks of motion data */
        struct DATA_BLOCK *active, *lastblk, *buffer;
                /* encountered a reason not to
                read in any more blocks */
        extern BOOL motion_break;
                /* Number of blocks in lookahead buffer */
        static COUNT nblk_left = 0;
                /* end of file encountered */
        extern BOOL endfile;
                /* */
        int acc_constraint;
        long reach(), temp;
        unsigned short plan_fat;        /* planned final attenuation
                                        of block before reduction
                                        because of limited accel
                                        distance */

/**********/
                /* Get the first (and possibly only) block
                   in the datablock queue */
        active = db_q.first;

/* Non-motion blocks get no acc/dec work,
                   and in fact reset the acc/dec logic */
        if (active->no_motion) {
                motion_break = NO;
                nblk_left = 0;
                return (YES);           /* nothing to do */
        }

/* Refresh the lookahead buffer if necessary.
           We want to have as many blocks in the
           buffer as possible so that we don't run
           a reverse velocity profile any more often
           than necessary.  There is no point to looking
           beyond a non-motion block, or past the
           end of the file.  Of course, there is
           a limit to the size of the buffer.  Once
           the buffer is full, we don't want to attempt
           a refill until we determine that we are
``` appended to the working queue.

PRECAUTIONS OR UNUSUAL CONDITIONS:

**************************************************************
*/
include <stdio.h>
include "nctofnc.h"
include "accel.h"

BOOL accend()
{
               /* Queue of active blocks */
        extern struct QCB db_q;
               /* Blocks of motion data */
        struct DATA_BLOCK *active, *lastblk, *buffer;
               /* encountered a reason not to
                  read in any more blocks */
        extern BOOL motion_break;
               /* Number of blocks in lookahead buffer */
        static COUNT nblk_left = 0;
               /* end of file encountered */
        extern BOOL endfile;
               /*    */
        int acc_constraint;
        long reach(), temp;
        unsigned short plan_fat;    /* planned final attenuation
                                       of block before reduction
                                       because of limited accel
                                       distance */

/**********/
               /* Get the first (and possibly only) block
                  in the datablock queue */
        active = db_q.first;

/* Non-motion blocks get no acc/dec work,
                  and in fact reset the acc/dec logic */
        if (active->no_motion) {
                motion_break = NO;
                nblk_left = 0;
                return (YES);         /* nothing to do */
        }

/* Refresh the lookahead buffer if necessary.
           We want to have as many blocks in the
           buffer as possible so that we don't run
           a reverse velocity profile any more often
           than necessary. There is no point to looking
           beyond a non-motion block, or past the
           end of the file. Of course, there is
           a limit to the size of the buffer. Once
           the buffer is full, we don't want to attempt
           a refill until we determine that we are

```
                limited by lookahead*/
        if ( (active->look_limited == YES)
                && (endfile == NO) && (motion_break == NO)) {
                do {
                        switch (getdb()) {
                        case NO:
                                return(NO);
                        case EOF:
                                motion_break = YES;
                                break;
                        case YES:
                                lastblk = db_q.last;
                                if (lastblk->no_motion == YES){
                                        motion_break = YES;
                                        break;
                                }
                                ++nblk_left;
                        }
                } while ((nblk_left < LOOKAHEAD_BLOCKS)
                                && (!endfile) && (!motion_break));
                /* Perform a reverse velocity profile on the
                   newly-refreshed lookahead buffer, if
                   there are any blocks to work with*/
                if (nblk_left)
                        revprof();
        }
                /* Decrement the number of blocks in the lookahead buffe since we're going to remove an element. */
        --nblk_left;

/* Now we have the necessary information to
                   determine the attenuation factor for the
                   active block */

/* If the active block is the last one, or
                           if the next block is a non_motion block,
                           we know that we are stopping at the
                           end of the block */ buffer = active->next_db;
        if ((buffer == NULL) || (buffer->no_motion == YES)) {

/* Rationale is that the maximum attenuation
                           rate is that number of units that can
                           be accommodated in a step, so it is a
                           good end value, as the next step is
                           effectively zero.   */
                active->fatten = active->max_atten_rate;
                return (YES);
        }
                        /* The buffer block is a motion-type block,
                           so the active block will
                           already contain a final attenuation
                           factor based on the corner, but we may
```

```
                       not be able to get reach that speed
                       within the block length; if we can't
                       the final attenuation value will be
                       set to the speed we can acheive, and
                       the initial attenuation of the buffer
                       block will be recalculated to reflect
                       this. */
        temp = reach(active->iatten, active->nom_rate,
                        active->num_sam, active->max_atten_rate);

acc_constraint = (temp < 32767) ? temp : 32767;
        if (acc_constraint < active->fatten) { active->nu02 &= 0x0001; /* Trace; 1 if accel limited, 0 if
                                   corner limited at accend */
                plan_fat = active->fatten;
                active->fatten = acc_constraint;
                buffer->iatten = ( active->fatten * buffer->iatten)/plan
_fat;
        }
        return(YES);
}
```

```
/*      ************************************
        *                                  *
        *       accramp.c                  *
        *                                  *
        *  calculate acc/dec ramp          *
        *     MCU host                     *
        *                                  *
        ************************************
```

FUNCTION:
- Determine ramp times of the velocity profile of a path segment.
  This function is applied after the beginning and end rates
  of the motion of this segment have been determined by other
  functions. This function calculates a three-section
  velocity profile which normally starts at the initial
  rate, accelerates at an axis-limited level to the desired
  steady-state velocity, then decelerates linearly to the
  end velocity, again based on pushing the machine to the
  specified limit. There are degenerate cases in which
  ramp sections are missing, for example when it takes all
  of the distance in the block to decelerate, not leaving
  any opportunity for acceleration or constant velocity.

This function is always guaranteed that the final velocity
  is reachable from the initial velocity. The function
  always optimizes the motion; that is, it waits as long as
  possible for deceleration, thus maximizing machine
  performance.

The path segment as received is known to consist of a number of
  "samples", each of equal distance. Velocity information
  is in the form of a nominal velocity and initial and
  final attenuations to that velocity. The task is to
  ascertain the other points on the profile; these points
  include the number of samples of the accel ramp together
  with its end attenuation, and the number of samples of
  the decel ramp, which must begin at the end attenuation
  of the accel ramp.

```
                      *******************
                    *                     *
                  *                         *
         init ->*                             *
                                                *
                                          *<- final
```

USE:
  SYNOPSIS:
    BOOL accramp();

RESULTS:
  Returns YES if successful.

The data block at the head of the queue of active
  blocks contains constraints on the velocity
  profile of the block; these constraints are
  used to calculate the ramps of accel and decel:
  resulting data is stored in the block.

DERIVATION OF EQUATION:

v = instantaneous velocity (counts per second)
  s = distance (counts);

```
n = distance (samples) (1 sample = 4096 counts)
m = maximum permitted change in atten per 5 millisecond.
a = acceleration (counts/sec/sec)
alpha = attenuation ratio (dimensionless)
      = atten/32767
f = frequency (counts per second) = r * RATE_CONST
      where r is the rate generator command word.

basic equation is derived in "profile.c" of mcu.

n = (r * (alphaf**2 -alpha0**2 ) / (m * 32768 * 46432)
```

PRECAUTIONS AND UNUSUAL CONDITIONS:
Although some of the equations are based upon a 5 ms
rate, it is unrelated to the update rate of the MCU.

```
*************************************************************
*/
#include "nctofnc.h"
include "accel.h"

BOOL accramp()
{
    extern struct QCB db_q;         /* queue of data blocks */
    struct DATA_BLOCK *active;      /* Active data block */
        /* Initial and final attenuations */
    register unsigned short iat, fat;
    unsigned short highest;
    unsigned short sam_left;
    COUNT ndelta, nmax;
    long reach();
    unsigned short ramp();

/**********/
    active = db_q.first;
    if (active->no_motion)
        return(YES);

iat = active->iatten;
    fat = active->fatten;

if ((sam_left = active->num_sam) == 1){
        active->satten = iat;
        return (YES);
    }
            /* Determine the number of samples to get
               from the initial to the final rate. If
               the final rate is lower than the initial,
               they are all decel samples; if higher, they
               are accel samples. The number of samples
               remaining is debited by the samples making
               up the attenuation difference (if any).
               If the number of remaining samples is odd,
               the odd one is given to the acc (dec) samples,
               leaving an even remainder */ if (iat > fat) {
        ndelta = ramp (iat, fat, active->max_atten_rate,
                       active->nom_rate);
```

```
                active->dec_nsam = ndelta;
                sam_left -= ndelta;
                if (sam_left & 1) {
                        ++active->dec_nsam;
                        --sam_left;
                }
        } else if (fat > iat) {
                ndelta = ramp (fat, iat, active->max_atten_rate,
                                        active->nom_rate);
                active->acc_nsam = ndelta;
                sam_left -= ndelta;
                if (sam_left & 1) {
                        ++active->acc_nsam;
                        --sam_left;
                }

}

/* If we've used up all the samples in acc/dec,
                   there's nothing else to do */
        if (! sam_left){
                active->satten = active->fatten;

return(YES);
        }

/* Since there are samples remaining, see
                           how many would be required to hit the
                           maximum attenuation value */ highest = (iat > fat) ? iat : fat;
        if (highest == 32767) {
                active->satten = 32767;

return(YES);
        } nmax = ramp(32767, highest, active->max_atten_rate,
                        active->nom_rate) ;
                                /* Evenly allocate the number of samples
                                   amounting to less than twice the amount
                                   required to hit the maximum value between
                                   the acc and dec sample counts */
                if ((2 * nmax) <= sam_left) {
                        active->acc_nsam += nmax;
                        active->dec_nsam += nmax;
                        active->satten = 32767;
                }
                else {
                        active->acc_nsam += sam_left / 2;
                        active->dec_nsam += sam_left / 2 ;
                        active->satten =(unsigned short) reach(
                                highest, active->nom_rate,
                                (sam_left / 2), active->max_atten_rate);
                }
                return(YES);
}
```

```
unsigned short ramp(hiatt, loatt, mar, rate)
unsigned short hiatt;          /* Higher attenuation value*/
unsigned short loatt;          /* lower attenuation value */
unsigned short mar;            /* ... change of attenuation
                                  permitted per 5 ms */
unsigned short rate;           /* ...al rate generator value */
{
        float temp;
/*****/ temp = (
                (
                   (float)((hiatt * hiatt) - (loatt * loatt))
                   * rate
                )
                /
                (32768.0 * 46432. * mar)
               ) + 0.5;

return((temp < 1) ? 1 : (1 * temp));

}
```

```
/*       *************************************
         *                                   *
         *         accgen.c                  *
         *                                   *
         *    Generate MCU data block        *
         *        MCU host                   *
         *                                   *
         *************************************

FUNCTION:
     Append a MCU motion block to the motion file
     based upon the data of the current active
     data block.

USE:
     SYNOPSIS:
          BOOL accgen()

RESULTS:
     MCU-format data for the current active block is
     written to the output file, and the queued block
     is returned (uncleaned) to the available pool.

PRECAUTIONS AND UNUSUAL CONDITIONS:
        The function puts the end of program code in
        the data stream.  If there is no block to
        put it in, a standalone block is dummied up.

***************************************************************
*/
include <stdio.h>
include "nctofnc.h"
include "accel.h"
#include "wire.h"

BOOL accgen()
{
     extern BOOL endfile;        /* True when out of data */
     extern BOOL endprog;        /* YES when programmed end of
                                     program was detected */
     extern struct QCB db_q;     /* active data blocks queue */
     extern struct QCB db_pool;  /* Avaliable pool */
     struct DATA_BLOCK *active;  /* active block */ int n;
        unsigned short wksp;     /* workspace */

/*********/
        if (endfile) { /* no block!! */
                codeout (0x71, 1);        /* one sample */
                codeout (0x70, 10000);    /* Rate generator */
                codeout (0x0, 1);         /* Terminator */
                return (YES);
        }
        active = db_q.first;
                /* Sequence Number */
        if (active->seq_no)
                codeout (0x1, active->seq_no);

/* Debug tracer */
        if (active->nu02)
                codeout (0x2, active->nu02);
```

```c
        /* Axis departures and velocities*/
for ( n = 0; n < NUM_AX; n++ ){
        if (active->depart[n]) {
                brkup ((0x10 + n), (0x30 + n),
                        active->depart[n], (22 - active->fbits))

codeout ((0x50 + n), active->comd_vel[n]);

}
}

/* Rate generator value */
codeout (0x70, active->nom_rate);

/* Number of samples */
codeout (0x71, active->num_sam);

/* Attenuation values */
if (active->iatten)
        codeout (0x72, active->iatten);
if (active->satten)
        codeout (0x73, active->satten);
if (active->fatten)
        codeout (0x74, active->fatten);
if (active->acc_nsam)
        codeout (0x75, active->acc_nsam);
if (active->dec_nsam)
        codeout (0x76, active->dec_nsam);

/* Miscellaneous code */
if (active->misc_code)
        codeout (0xf0, active->misc_code);

/* Pen code */
if (active->pen_code)
        codeout (0xf1, active->pen_code);

/* Tool code */
if (active->tool_code)
        codeout (0xf2, active->tool_code);

/* Spindle speed code */
if (active->spdl_code)
        codeout (0xf3, active->spdl_code);

/* Prepare the terminator sample */
wksp = 0;       /* clear the workspace */
if (active->misc_code == REWIND_STOP ) {
        endprog = YES;
        wksp |= 1;
}
if (active->last_db)
        wksp |= 2;
if (active->misc_code == PLANNED_STOP)
        wksp |= 4;
if (active->misc_code == OPTION_STOP)
        wksp |= 8;
codeout(0x0, wksp);
```

```
                /* Done, pop datablock from top of queue and
                    return it to the available pool */
        enqueue(dequeue(&db_q, active), &db_pool);
        return (YES);
} brkup (intadd, fracadd, depart, nshift)
COUNT intadd, fracadd;
long depart;
COUNT nshift;
{
        extern FILE *outfile;
    BOOL signsave;
    unsigned short temp;
/*******/
    if (depart < 0) {
        signsave = YES;
        depart = -depart;
    }
    else
        signsave = NO;
    temp = depart >> nshift;
    if (signsave)
        temp != 0x8000;
    codeout (intadd, temp);
    temp = depart << (16 - nshift);
    codeout (fracadd, temp);

} codeout(code, value)
char code;
unsigned short value;
{
        extern FILE *outfile;
/*********/
    putc (code, outfile);
    putc (((value >> 8) & 0xFF), outfile);
    putc ((value & 0xFF), outfile);
}
```

```
/*     *******************************************
       *                                         *
       *           getdb.c                       *
       *                                         *
       *  Get a new fnc data block               *
       *      Machine Control Unit Host          *
       *                                         *
       *******************************************

FUNCTION:
    Appends new fnc datablocks to the end of the working
    queue. These new blocks contain path segment data.
USE:
    SYNOPSIS:
        COUNT getdb()

RESULTS:
    Returns YES if new block has been prepped.

Returns EOF if end-of-file has been encountered,
    and will NOT have a new block;

Returns NO on fault.

A new block will be appended to the end of the queue.
    This block may be the result of fetching a new
    line from the filesystem, or may be generated
    as a continuation of a block in work. Some motion
    calculation will have been done on the block.

PRECAUTIONS AND UNUSUAL CONDITIONS:

*********************************************************************
*/
include <stdio.h>
include "nctofnc.h"
include "accel.h"

int getdb()
{       extern FILE *infile;            /* Source data file */
        extern UCOUNT line_no;          /* Source data line number */
        extern struct QCB db_q;         /* Queue of working blocks */
        extern struct QCB db_pool;      /* Pool of unused blocks */ extern BOOL endfile;            /* Real end of file */
        struct DATA_BLOCK *newdb, *old_last;
        struct DATA_BLOCK *dequeue(), *enqueue();
        static BOOL end_of_file = NO;

char *bz;                       /* For zeroing block */
        int i;

int retval;                     /* Temp */
/******/
        if (end_of_file)
                return(EOF);

/* Get a datablock from the unused pool, put it
                   at the end of the working queue, and clean it up */
```

```
        old_last = db_q!last;
        newdb = dequeue(&db_pool, db_pool.first);
        bz = (char *)newdb;
        for (i = 0; i < sizeof(struct DATA_BLOCK); i++)
                *bz++ = 0;
        enqueue(newdb, &db_q);
        newdb->prev_db = old_last;

/* Put some values in the block to default it
                        to a 10-ms non-motion block */
        newdb->no_motion = YES;
        newdb->nom_rate = 12345;         /* Make it recognizeable */
        newdb->num_sam = 1;

/* Call the routine that fills the datablock with
                        linear line segments from source data.
                        Skip bad blocks on the presumption that
                        the errors have been reported */ while ((retval = b_mkdb(newdb)) == NO) {
                ; } if (retval == EOF){
                end_of_file = YES;
                return (EOF);
        }

/* Call the routine that does initial
                        feedforward calculations */
        retval = dbcalc(newdb);
#if ADBGLEV > 1
printf ("getdb: returning %s\n", retval ? "YES" : "NO");
printf ("\tSource line = %d\n", newdb->src_line_no);
printf ("\tAxis 0 = %ld\n", newdb->depart[0]);
printf ("\tAxis 1 = %ld\n", newdb->depart[1]);
printf ("\tDac 0 = %d\n", newdb->comd_vel[0]);
printf ("\tDac 1 = %d\n", newdb->comd_vel[1]);
printf ("\tfval = %ld\n", newdb->fval);
printf ("\tno_motion = %s\n", newdb->no_motion ? "YES" : "NO");
printf ("\tnom_rate = %u\n", newdb->nom_rate);
printf ("\tnum_sam = %u\n", newdb->num_sam);
#endif;
        return(retval);

}
```

```
/*          ************************************
            *           revprof.c               *
            *                                   *
            *      Reverse Velocity Profile     *
            *          MCU host                 *
            *                                   *
            ************************************

FUNCTION:
        Put "lookahead" data in a queue of motion blocks,
        working backwards through the queue so that the
        blocks in the front of the queue get forward
        visibility of corners, straightaways, and stops.

USE:
        SYNOPSIS:
                VOID revprof()

The queue must already be full of a series of contiguous
        path segment blocks (e.g., no non-motion blocks).  The last
        block may be a non-motion block (in fact, this is the
        usual case).

Per-axis velocity values and a maximum rate of change of
        attenuation for the path segment must already be contained
        within the block.
RESULTS:
        Attenuation values are set in all the path segments of the
        queue reflecting slowdowns for corners and stops.
        The calculations are such that it is guaranteed that
        no axis will be called upon to accelerate at a
        higher rate than permitted.

No return value.

PRECAUTIONS AND UNUSUAL CONDITIONS:
        If the last block in the queue is not a non-motion block,
        we assume that we stop (zero velocity) at the end of the
        last block, lacking contrary evidence.  This may mean
        that we are slowing unnecessarily; in this case, flags
        are set in blocks that are slowed because of this lack
        of visibility, so that the data can be updated when
        more blocks are added to the queue later, increasing
        feedforward visibility.

It is permitted that the queue contain but a single
        block.

**************************************************************
*/
#include "nctofnc.h"
include "accel.h"

VOID revprof()
{
        extern struct QCB db_q;         /* queue of data blocks */
                        /* Block we're working on */
        struct DATA_BLOCK *current;
                        /* Block just before the one we're
                           working on */
        struct DATA_BLOCK *predecessor;
```

```
               long reach(), temp;
               COUNT look_nsam;  /* Calculates distance (in samples)
                                        to end of lookahead buffer */
/*****/
               /* We can't see beyond the end of the buffer */
       look_nsam = 0;
               /* Move the pointer to the last block
                       of the buffer */
       current = db_q.last;

/* If this block is also the first block in
                       the queue, we have but one block, so
                       its final velocity must be zero. */
       if (db_q.first == current) { current->fatten = current->max_atten_rate;
               return;
       }

/* If the last block is not a motion block (the
                       usual condition), we move the pointer back
                       to the previous block, which is a motion block.
                       If the last block is a motion block, it means
                       that we ran out of space in the lookahead buffer,
                       and will have to assume a zero velocity, and
                       record the lack of visibility for future correction
                       In both cases, the final attenuation value of
                       the last motion block is zero (or nearly so ) */ if (current->no_motion == YES)
               current = current->prev_db;
       else
               current->look_limited = YES;
       current->fatten = current->max_atten_rate;

do {
                       /* Calculate the highest initial attenuation
                               that we can use from which we can
                               decelerate to the final attenuation
                               of the block */
               temp = reach (current->fatten, current->nom_rate,
                               current->num_sam, current->max_atten_rat
e);

current->iatten = (temp > 32767) ? 32767 : temp;

/* Now evaluate the corner at the
                               entry point to this block; first
                               get the other line segment defining
                               the corner */
               predecessor = current->prev_db;

/* Propagate the lookahead limiting flag
                               until we perceive it to no longer
                               be a limiting factor */ if (current->look_limited == YES) {
                       predecessor->look_limited =
                           ((look_nsam += current->num_sam) >
                                       (LOOKAHEAD_BLOCKS - 10))
                                ? NO : YES ;
```

```
        }
        else {
                predecessor->look_limited = NO;
        } predecessor->fatten = 32767;
        corner(predecessor, current);

} while ((current = predecessor) != db_q.first);

return;
}
```

```
/*      *******************************************
        *                                         *
        *            reach.c                      *
        *                                         *
        *     Determine acheivable speed          *
        *     Machine Control Unit Host           *
        *                                         *
        *******************************************
```

FUNCTION:
    Determine how fast we can be going at the end of a
    path segment block, given some dynamic parameters.

USE:
    SYNOPSIS:
        long reach (iatten, rate, nsam, max_atten_rate)
        unsigned short iatten;   (inital attenuation)
        unsigned short rate;     (rate generator command)
        unsigned short nsam;     (number of samples)
        unsigned short max_atten_rate; (delta atten per 5 ms)

RESULTS:
    The function returns the final attenuation factor for the
    block.

DERIVATION OF EQUATION:
    dr = (F/S) * (rf2 - r02) / 46432 alphaf = sqrt (alpha0**2 + 32768 * 46432 * m * n / r)

PRECAUTIONS AND UNUSUAL CONDITIONS:

Constants used assume that max_atten_rate is based upon
    a 5 millisecond sample period, which is entirely
    independent of the MCU feedrate update sampling
    period.

TIMING:

```
***************************************************************
*/
#include "nctofnc.h"
include "accel.h"

long reach (iatten, rate, nsam, mar)
unsigned short iatten, rate, nsam, mar;
{
        double sqrt();
/****/
        return((long)sqrt( (double)(iatten * iatten)
                                +
                                (32768.0 * 46432.0 * mar * nsam) / rate)
};
```

```
/******************************************
 *                                         *
 *          corner.c                       *
 *                                         *
 *  Determine cornering attenuations       *
 *      Machine Control Unit Host          *
 *                                         *
 ******************************************
```

FUNCTION:
    Calculate the attenuation factors to be applied to
    the incoming and exiting velocities of a corner defined
    as the intersection of two multiaxis path segments.

USE:

SYNOPSIS:
        VOID corner(incoming, outgoing)
            struct DATA_BLOCK *incoming, *outgoing;

The arguments are two datablock structures which contain
    path segment data. The significant arguments are the
    nominal axis velocities. The final attenuation value
    of the incoming path segment and the initial attenuation
    value of the exiting path segment must be set to any
    (upper) limiting value (32767 as absolute max).

RESULTS:
    The final attenuation value of the incoming path segment
    and the initial attenuation value of the outgoing
    path segment are reduced to values which will permit the
    corner to be negotiated with acceptable axis stresses.

PRECAUTIONS AND UNUSUAL CONDITIONS:
    'Glitches' occur in the velocity profile of a moving
    axis when another axis undergoes a direction reversal.
    This is because the algorithm doesn't "balance" the
    step of the reversing axis across zero velocity.
    The glitch has different sizes and polarities for
    different motion situations, but is assumed tolerable.

```
****************************************************************
*/
#include "nctofnc.h"
include "accel.h"
#include "wire.h"

VOID corner(inblk, exblk)
struct DATA_BLOCK *inblk, *exblk;       /* Entry & exit vectors*/
{
            /* Axis data */
        extern struct AX_FMT ax_reg[];

COUNT move[NUM_AX];                /* Records which axes have
                                              collinear motion */
            int step[NUM_AX];
            int avi[NUM_AX], avf[NUM_AX]; /* Absolute values of velocities at
                                              intersection */
        COUNT nmove;                       /* How many axes have collinear
                                              motion */
```

```
            COUNT n;
            int nvi, nvf;              /* Nominal velocities at intersection */
            int si, sf;                /* attenuation factors */
            COUNT axis;
            int vi, vf, limit;

BOOL change;
/*******/
            /* Set working attenuation factors to those found
               in the blocks upon entry */
            si = exblk->iatten;
            sf = inblk->fatten;

/* Check all axes; ignore those with no motion,
               save axis numbers of those axes with collinear
               motion for later processing; determine limiting
               attenuations for those axes with reversing motion */
            for (n = 0, nmove = 0; n < NUM_AX; n++) {
                    nvi = exblk->comd_vel[n];
                    nvf = inblk->comd_vel[n];
                    if ( (nvi == 0) && (nvf == 0) )
                            continue;          /* No motion this axis */

/* There is some motion on this axis; record
                       the permitted step in attenuated velocity */
                    step[n] = (inblk->is_traverse ?
                                    ax_reg[n].p_acc : ax_reg[n].c_acc) << 15 avi[n] = abs(nvi);
                    avf[n] = abs(nvf);

/* If the axis is collinear, save its index */
                    if ( (nvi > 0) == (nvf > 0) ) {
                            move[nmove++] = n;
                            continue;          /* Get next axis */
                    }

/* This axis has reversal; adjust both attenuations
                       if necessary so that each velocity is within
                       'step' of zero.  */
                    if ((si * avi[n]) > step[n])
                            si = (step[n]) / avi[n];
                    if ((sf * avf[n]) > step[n])
                            sf = (step[n]) / avf[n];
            }

/* Now that the attenuations are adequate for any
               axis reversals encountered, iterate on those axes
               until all met the 'step' specification. Note that
               this only results in reducing attenuation values,
               which is ok for already-solved corners. */ do {
                    change = NO;
                    for (n = 0; n < nmove; n++) {
                            axis = move[n];
                            vi = avi[axis] * si;
                            vf = avf[axis] * sf;
                            limit = step[axis];
```

```
                                            /* We adjust attenuation by attenuating
                                                the current fastest corner speed */
                            if (vi > vf) {
                                if (vi > (limit + vf) ) {
                                        si = (limit + vf) / avi[axis];
                                        si -= si >> 4;  /* Speeds converg
ence */
                                        change = YES;
                                }
                            }
                            else {
                                if (vf > (limit + vi) ){
                                        sf = (limit + vi) / avf[axis];
                                        sf -= sf >> 4;  /* Speeds converg
ence */
                                        change = YES;
                                }
                            }
                        }
                    }
                } while (change == YES);

/* All done; report the attenuation values back
                            into the data structures */
                inblk->fatten = sf;
                exblk->iatten = si;
```

I claim:

1. A system for controlling a plurality of machines, each machine including multiple independent actuators for moving a member along a path with respect to multiple axes, said system comprising:

input means for supplying a part program for each of said machines, each part program defining the terminal coordinates of successive path portions;

host computer means;

program means for operating said host computer means to generate with respect to each machine, a feedforward data file based on said part program input means comprised of a series of data blocks, each data block defining a profile of position and velocity versus time with respect to a linear path segment, said program means including means for looking ahead at the direction and magnitude of subsequent path portions to generate the data block defining each path segment;

a plurality of machine control units, each connected to a different machine;

means for distributing each data file generated by said host computer means to one of said machine control units;

each of said machine control units including:

position commander means responsive to each data block for generating a plurality of command position signals each associated with a different actuator;

velocity profiler means responsive to each data block for generating a plurality of feedforward velocity signals, each associated with a different actuator;

each actuator having associated therewith;

position sensor means for generating an actual position signal with respect to the associated actuator;

means for summing the command position and actual position signals generated with respect to the associated actuator for producing a position error signal for that actuator; and means for summing said command position error and feedforward velocity signals generated with respect to each actuator for producing a command velocity signal with respect to that actuator.

2. The system of claim 1 wherein at least some of said plurality of machine control units are physically located remote from said host computer means; and wherein said means for distributing includes data network means for communicating digital data between said host computer means and said machine control units.

3. The system of claim 1 wherein said input means also supplies target machine specification data; and wherein said program means is additionally responsive to said target machine specification data for generating said feedforward data file.

* * * * *